(12) United States Patent
Colley et al.

(10) Patent No.: US 8,788,200 B2
(45) Date of Patent: Jul. 22, 2014

(54) METHOD AND SYSTEM FOR A DATA INTERFACE FOR AIDING A SATELLITE POSITIONING SYSTEM RECEIVER

(75) Inventors: Jaime B. Colley, Laguna Niguel, CA (US); Lars Boeryd, Rancho Santa Margarita, CA (US)

(73) Assignee: CSR Technology Inc., San Jose, CA (US)

( * ) Notice: Subject to any disclaimer, the term of this patent is extended or adjusted under 35 U.S.C. 154(b) by 466 days.

(21) Appl. No.: 11/531,805

(22) Filed: Sep. 14, 2006

(65) Prior Publication Data

US 2010/0309042 A1 Dec. 9, 2010

Related U.S. Application Data

(62) Division of application No. 10/959,497, filed on Oct. 5, 2004.

(60) Provisional application No. 60/509,163, filed on Oct. 6, 2003, provisional application No. 60/509,186, filed on Oct. 6, 2003.

(51) Int. Cl.
*G01C 21/00* (2006.01)

(52) U.S. Cl.
USPC .......................................... 701/468; 701/472

(58) Field of Classification Search
USPC ............. 701/29, 213, 215, 31, 33, 34, 35, 36, 701/39; 342/357.15, 357.17, 357.03, 342/357.12, 357.09; 340/825, 825.06; 702/183, 184, 185
See application file for complete search history.

(56) References Cited

U.S. PATENT DOCUMENTS

| 5,680,306 | A | 10/1997 | Shin et al. |
| 5,787,384 | A | 7/1998 | Johnson |
| 5,892,462 | A | 4/1999 | Tran |
| 6,182,807 | B1 * | 2/2001 | Saito et al. ........................ 191/2 |
| 6,230,100 | B1 * | 5/2001 | Geier ............... 701/216 |
| 6,407,701 | B2 * | 6/2002 | Ito et al. ................... 342/357.12 |
| 6,484,096 | B2 * | 11/2002 | Wong et al. ................... 701/213 |
| 6,520,448 | B1 * | 2/2003 | Doty et al. ................... 244/3.23 |
| 6,611,228 | B2 * | 8/2003 | Toda et al. ............... 342/357.04 |
| 6,748,325 | B1 * | 6/2004 | Fujisaki ........................ 701/301 |
| 6,791,471 | B2 * | 9/2004 | Wehner et al. ................ 340/903 |

(Continued)

FOREIGN PATENT DOCUMENTS

| EP | 1 327 858 A2 | 7/2003 |
| WO | WO 01/20575 A1 | 3/2001 |

OTHER PUBLICATIONS

EP Search Report, Jul. 16, 2007.

*Primary Examiner* — Khoi Tran
(74) *Attorney, Agent, or Firm* — Haynes and Boone, LLP

(57) ABSTRACT

The invention described herein relates to aiding a Satellite Positioning System (SPS) receiver of a platform with a data interface to the platform data. The platform, for example, could be a vehicle, ship, aircraft, or a pedestrian. The SPS receiver would be used to track the location of the platform. The data interface would facilitate access by the SPS receiver to the data of the platform, and the SPS receiver in turn could provide SPS data (such as position, speed, and heading) to the platform. A further aspect of the invention includes hardware or software used by the data interface and the SPS receiver to provide, format, time-stamp, synchronize, and match platform data or SPS receiver data.

3 Claims, 14 Drawing Sheets

(56) References Cited

U.S. PATENT DOCUMENTS

| | | |
|---|---|---|
| 6,792,352 B1 | 9/2004 | Hoffmann et al. |
| 6,844,856 B1 * | 1/2005 | Wright .......................... 343/705 |
| 6,856,903 B2 * | 2/2005 | Ishigami et al. .............. 701/213 |
| 6,904,341 B2 * | 6/2005 | Kish et al. ....................... 701/21 |
| 6,917,644 B2 * | 7/2005 | Cahn et al. .................... 375/142 |
| 7,363,149 B2 * | 4/2008 | Klausner et al. .............. 701/207 |
| 2002/0049538 A1 * | 4/2002 | Knapton et al. .............. 701/216 |
| 2002/0116126 A1 | 8/2002 | Lin |
| 2003/0212481 A1 * | 11/2003 | Fuller ............................. 701/36 |
| 2004/0019411 A1 * | 1/2004 | Kuragaki et al. ................. 701/1 |

\* cited by examiner

METHOD AND SYSTEM FOR A DATA INTERFACE FOR AIDING A SATELLITE POSITIONING SYSTEM RECEIVER

PRIORITY CLAIM

The present application is a division of U.S. patent application Ser. No. 10/959,497 filed on Oct. 5, 2004 which claims benefit of priority under 35 U.S.C. 119(e) of U.S. Provisional Patent Application Ser. No. 60/509,163, filed Oct. 6, 2003, entitled "Distributed GPS/DR Navigation System," by Jaime B. Colley and Lars Boeryd, and U.S. Provisional Patent Application Ser. No. 60/509,186, filed Oct. 6, 2003, entitled "Integrated GPS and Map-Matching Navigation System," by Jaime B. Colley and Lars Boeryd, both of which are incorporated herein by reference in their entirety.

CROSS REFERENCE TO RELATED APPLICATION

This application is related to copending U.S. patent application Ser. No. 10/959,288, filed on Oct. 5, 2004, entitled "A System and Method for Augmenting a Satellite-Based Navigation Solution", by Jaime B. Colley and Lars Boeryd, which is incorporated by reference herein in its entirety.

FIELD OF THE INVENTION

The invention described herein relates to location and navigation systems using Satellite Positioning System (SPS) data combined with various other data sources, to aid in locating or navigating a platform, for example, an automobile, ship, aircraft, or any other object that can generate data.

BACKGROUND OF THE INVENTION

SPS Receivers

SPS receivers, such as, for example, receivers using the Global Positioning System ("GPS"), also known as NAVSTAR, have become commonplace. It is appreciated by those skilled in the art that GPS systems include Satellite Positioning System "SPS" and/or Navigation Satellite Systems. In general, GPS systems are typically satellite (also known as "space vehicle" or "SV") based navigation systems. Examples of GPS systems include but are not limited to the United States ("U.S.") Navy Navigation Satellite System ("NNSS") (also know as TRANSIT), LORAN, Shoran, Decca, TACAN, NAV STAR, the Russian counterpart to NAVSTAR known as the Global Navigation Satellite System ("GLONASS") and any future Western European GPS such as the proposed "Galileo" program. As an example, the US NAVSTAR GPS system is described in *GPS Theory and Practice*, Fifth ed., revised edition by Hofmann-Wellenhof, Lichtenegger and Collins, Springer-Verlag Wien New York, 2001, which is fully incorporated herein by reference.

GPS is funded by and controlled by the U.S. Department of Defense (DOD). While there are many thousands of civil users of GPS worldwide, the system was designed for and is operated by the U.S. military. GPS provides specially coded satellite signals that can be processed in a GPS receiver, enabling the receiver to compute position, velocity, and time. At least four GPS satellite signals are used to compute positions in three dimensions and the time offset in the receiver clock.

GPS position determination is based on a simple mathematical principle called trilateration. In order to solve for user position, the GPS receiver must determine two things: the location of at least three satellites above the user, and the distance between the user and each of those satellites. The GPS receiver solves these variables by analyzing high-frequency, low-power radio signals from the GPS satellites.

At a particular time every day, the GPS satellite or Space Vehicle (SV) begins transmitting a long, repeating, digital pattern called a pseudo-random code. The GPS receiver begins running the same digital pattern also at exactly the same time. When the satellite's signal reaches the receiver, its transmission of the pattern will lag slightly behind the receiver's running of the pattern. The length of the delay is equal to the signal's travel time. The receiver multiplies this time by the speed of light to determine how far the signal traveled. Assuming the signal traveled in a straight line, this is the distance from the receiver to the satellite.

In order to make this measurement, the GPS receiver and satellite both need clocks that can be synchronized down to the nanosecond. To make a satellite positioning system using only synchronized clocks, one would need to have atomic clocks not only on all of the satellites, but also in the GPS receiver itself. Atomic clocks are not an inexpensive consumer product. However, the Global Positioning System uses a clever, effective solution to this problem. Every satellite contains an expensive atomic clock, but the receiver itself uses an ordinary quartz clock, which it constantly resets. In summary, the receiver looks at incoming signals from four or more satellites and gauges its own inaccuracy, but, of course, the GPS clock is a source of errors too.

To determine location using four satellites, the GPS receiver mathematically requires (for three-dimensional positioning) that four spheres having a radius equal to the distance from an SV to the GPS receiver, all intersect at one point. Three spheres will intersect even if there are inaccuracies, but four spheres will not intersect at one point if the GPS receiver has measured incorrectly. Since the GPS receiver makes all its distance measurements using its own built-in clock, the distances will all be proportionally incorrect.

The GPS receiver can easily calculate the necessary adjustment that will cause the four spheres to intersect at one point. Based on this, it resets its clock to be in sync with the satellite's atomic clock. The GPS receiver does this constantly whenever it is on, which means it is nearly as accurate as the expensive atomic clocks in the satellites.

In order for the distance information to be of any use, the GPS receiver also has to know where the satellites actually are located. This is not particularly difficult because the satellites travel in very high and predictable orbits, the GPS receiver simply stores an almanac in memory describing where every satellite should be at any given time. Gravitational forces like the pull of the moon and the sun do change the satellites' orbits very slightly, but the Department of Defense constantly monitors their exact positions and transmits any adjustments to all GPS receivers as part of the satellites' signals.

This system works well, but inaccuracies are present. For example, this method assumes the radio signals will make their way through the atmosphere at a consistent speed (the speed of light). In fact, the Earth's atmosphere slows the electromagnetic energy down somewhat, particularly as it goes through the ionosphere and troposphere. The delay varies depending on where you are on Earth, which means it is difficult to accurately factor this into the distance calculations. Problems can also occur when radio signals bounce off large objects, such as skyscrapers, giving a receiver the impression that a satellite is farther away than it actually is. This phenomenon is sometimes referred to as multipath. Furthermore, satellites sometimes transmit inaccurate almanac data, misreporting their own positions.

Differential GPS (DGPS) helps correct these errors. The basic idea is to gauge GPS inaccuracy at a stationary receiver station. Since the DGPS hardware at the station already knows its own position, it can easily calculate its receiver's inaccuracy. The station then broadcasts a radio signal to all DGPS-equipped receivers in the area, providing signal correction information for that area. In general, access to this correction information makes DGPS receivers much more accurate than ordinary receivers.

Three binary codes shift the satellite's transmitted L1 and/or L2 frequency carrier phase. The C/A Code (Coarse Acquisition) modulates the L1 carrier phase. The C/A code is a repeating 1 MHz Pseudo Random Noise (PRN) Code. This noise-like code modulates the L1 carrier signal, "spreading" the spectrum over a 1 MHz bandwidth. The C/A code repeats every 1023 bits (one millisecond). There is a different C/A code PRN for each SV. GPS satellites are often identified by their PRN number, the unique identifier for each pseudo-random-noise code. The C/A code that modulates the L1 carrier is the basis for the civil uses of GPS.

The GPS receiver produces the C/A code sequence for a specific SV with some form of a C/A code generator. Modern receivers usually store a complete set of precomputed C/A code chips in memory, but a hardware shift register implementation can also be used. The C/A code generator produces a different 1023 chip sequence for each phase tap setting. In a shift register implementation the code chips are shifted in time by slewing the clock that controls the shift registers. In a memory lookup scheme the required code chips are retrieved from memory. The C/A code generator repeats the same 1023-chip PRN-code sequence every millisecond. PRN codes are defined for 32 satellite identification numbers. The receiver slides a replica of the code in time until there is correlation with the SV code.

Receiver position, that is, the end user position, is computed from the SV positions, the measured pseudo-ranges (corrected for SV clock offsets, ionospheric delays, and relativistic effects), and a receiver position estimate (usually the last computed receiver position). This is illustrated in the following pseudo-range navigation solution example, where three satellites are used to determine three position dimensions with a perfect receiver clock. In actual practice, three SVs are used to compute a two-dimensional, horizontal fix (in latitude and longitude) given an assumed height. This is often possible at sea or in altimeter equipped aircraft. Five or more satellites can provide position, time and redundancy. More SVs can provide extra position fix certainty and can allow detection of out-of-tolerance signals under certain circumstances.

In addition to the aforementioned clock errors, multipath errors, and land almanac errors, GPS position errors result from a combination of many other factors, including noise, bias, and blunders. Noise, bias, and blunder errors combine, resulting in typical ranging errors for each satellite used in the position solution. Noise errors are the combined effect of PRN code noise (around one meter) and noise within the receiver noise (around one meter). Bias errors result from Selective Availability and other factors. SA is controlled by the DOD to limit accuracy for non-U.S. military and government users. The potential accuracy of the C/A code of around 30 meters is reduced to 100 meters. Additionally, SV clock errors, Ephemeris data errors, Tropospheric delays, Ionosphere delays, and multipaths can all result in bias errors. Multipath is caused by reflected signals from surfaces near the receiver that can either interfere with or be mistaken for the signal that follows the straight line path from the satellite. Multipath is difficult to detect and sometimes hard to avoid. Blunders can result in errors of hundreds of kilometers. Blunders include control segment mistakes due to computer or human error and can cause errors from one meter to hundreds of kilometers. User mistakes, including incorrect geodetic datum selection, can cause errors from one to hundreds of meters. Receiver errors from software or hardware failures can cause blunder errors of any size.

In an environment where the SPS signal reception is poor, dead reckoning (DR) position data can be used to supplement SPS receiver position information. In the terrestrial or near-terrestrial environment, such as for automobiles, ships, boats, and aircraft, dead reckoning uses such simple "inertial navigation" tools as an odometer sensor and a gyroscope, such as a vibrational gyroscope.

DR navigation requires that the vehicle's travel distance and direction are available in substantially real time and on a substantially continuous basis. In textbook dead reckoning, the distance and direction are represented as a vector sum of the many course and distance vectors from origin to current location. In the aviation and marine environments, wind and current vectors are also present from instrumentation. In an automobile, the travel distance information is obtained from an odometer, while the direction information is typically obtained from a gyroscope, to provide location information.

SPS and DR in Automotive Applications

If a vehicle equipped with DR navigation starts a trip from a known location, the distance and direction from the known location can be used to determine the current location. For example, if the vehicle is traveling on a flat road, the travel and direction information (the individual direction and distance (that is, either "velocity times time" or odometer) vectors) can be summed to compute the vehicle's present position.

An odometer is a standard item of equipment, where the number of revolutions at a non-traction wheel is converted into a distance traveled value. The number of revolutions is converted into a distance with the odometer scale factor. However, the odometer scale factor changes over time due, for example, to tire slipping and skidding, tire pressure variations, tire wear, and even vehicle speed. This can cause significant positional error. However, vibrational gyroscopes are sensors that measure the angular rate (heading rate) based on Coriolis acceleration. A vibrational gyroscope outputs a voltage that is proportional to the angular velocity of the vehicle. The vehicle's heading rate is obtained by multiplying the vibrational gyroscope output voltage by a scale factor. However, vibrational gyroscopes, like odometers, also suffer from error accumulation. This can be due to gyroscope bias and scale factor instability. Gyroscope bias is almost always present, and is to some extent temperature dependent. It is an observable error, and can cause a gyroscope to output a non-zero value even if the angular velocity is zero. Gyroscope bias is observable even when the vehicle is not moving or when it is moving in a straight line. Gyroscope scale factor error affects gyroscope measurements when the vehicle is turning.

Both SPS receivers and DR suffer from limitations. For example, the SPS signal may have SPS receiver errors or the SPS signal may not be available in obstructed areas such as urban canyons or tunnels. While the DR system can drift over time and accumulate errors. However, the integration of SPS and DR yields a positioning system that is superior to either SPS or DR alone. The two systems are integrated through digital signal processing (DSP) where the SPS subsystem inputs control the drift and error accumulation of the DR subsystem, and the DR subsystem becomes the main positioning system during SPS outages. The result is an integrated system that is better than either alone.

The integration of SPS with DR in the urban terrestrial environment is particularly valuable for urban transit vehicles, urban delivery vehicles, and first responder vehicles. In the case of urban transit vehicles, real time transit vehicle locations aid scheduling and vehicle management and can provide real time information to passengers at transit stops. For delivery vehicles, real time position information is a powerful fleet monitoring tool that minimizes delivery delays and enhances profitability. As to first responder emergency vehicles, the minimization of delays enroute to a fire, accident, or life threatening medical emergency is critical.

Current Problems with Conventional SPS and DR in Automotive Applications

Conventional automotive SPS systems with DR implementations typically comprise a SPS receiver and a navigation processor, which has the capability of receiving direct DR sensor measurements, i.e. the gyroscope and odometer signals are brought directly to the navigation processor from the sensors themselves. The reason this is done is twofold. Firstly, it eliminates any timing discrepancy between the DR sensors' measurements and the SPS measurements; they are all on the same time base. Secondly, It gives the system architect complete control over the DR sensor sampling rate. Usually, the gyroscope will be collocated with the navigation processor, and odometer and reverse signals will come in to the navigation processor through dedicated wires (one wire per signal) directly to the navigation processor. Finally, in most instances, the SPS system is only part of a larger dedicated system, such as a telematics system, that provides all data inputs and outputs to the rest of an automobile.

In conventional systems the navigation processor and SPS receiver data are combined with vehicle sensor data, such as gyroscope data, to produce a vehicle location solution. Vehicle sensor data, however, is processed DR calculations to obtain a vehicle location. Though SPS receiver data alone provides location, current vehicle location technology can combine the SPS receiver data with vehicle sensor data so that the two data sources may supplement and enhance each other. For example, if SPS measurements are temporarily unavailable due to a major obstruction existing between the vehicle's SPS antenna and the SPS satellites, vehicle sensor data can provide location using DR calculations alone.

Referring to FIG. 1, an automobile navigation system 100 found in the prior art is shown. A SPS antenna 102 receives SPS signals transmitted from SPS satellites 103. The SPS signals are sent to the SPS receiver 104. Typically, the SPS receiver comprises a SPS radio and a location processor. In the SPS receiver 104, the SPS signals are converted from analog to digital signals. The location processor in the SPS receiver 104 uses these digital signals to compute position, velocity, and heading. The SPS receiver then sends the computed values for position, velocity, and heading, the SPS receiver data, to a navigation processor 106. The navigation processor 106 receives other sources of data in addition to the SPS receiver data. The navigation processor 106 receives heading rate data from a gyroscope 108. The gyroscope 108 is physically connected to the navigation processor 106 with a wire. The gyroscope 108 provides vehicle data representing the heading rate of the vehicle. This is a direct measurement of heading.

Typically, the navigation processor 106 receives two other sources of vehicle sensor data in addition to the gyroscope and SPS receiver data. The navigation processor 106 receives vehicle sensor data from the vehicle speed sensor 110 and the vehicle reverse signal sensor 112. The vehicle speed sensor 110 provides a vehicle speed signal to the navigation processor 106. The vehicle reverse signal sensor 112 provides reverse signal data to the navigation processor 106. These two sensors are physically connected to the navigation processor 106 with wires.

So the navigation processor 106 typically receives four sources of data, the SPS receiver data, the gyroscope data, the vehicle speed signal data, and the reverse signal data. These four sources of data are each provided to the navigation processor 106 separately. In some systems, the navigation processor 106 receives additional sources of vehicle sensor data, such as, for example, compass data and map data, used in determining location and navigation solutions for the vehicle. These sources of data are combined and processed in the navigation processor 106 to provide a vehicle location result. Typically, the SPS receiver data plays two roles in the calculations taking place in the navigation processor 106. One role is to calibrate the other vehicle sensor data. Another role is to check on the accuracy of the location solution obtained by the dead reckoning calculations performed on the gyroscope and the vehicle sensor data (the non-SPS receiver data).

Once the navigation processor 106 calculates a vehicle location solution based on the SPS receiver data and the vehicle sensor data, the vehicle location solution is typically sent to an external output, such as, for example, a display 114. The display 114 can be viewed by the vehicle operator thus providing the driver with location information. Other similar examples of SPS systems found in the prior art are described in *Understanding GPS: Principles and Applications*, ch. 9 (Elliott D. Kaplan ed., Artech House Publishers, 1996), incorporated herein by reference in its entirety.

This traditional system for determining vehicle location has drawbacks. Conventional automotive SPS systems with DR implementations as described above have at least some disadvantages. Firstly, there are installation issues. In order to operate the system, an installer must make a physical connection to the vehicle speed sensor (VSS) and to the source of the reverse signal. Since there is no one industry wide standard dedicated connection for these signals in a motor vehicle, the process of locating and routing these wires tends to be labor intensive and prone to errors. In order for the system to operate, a physical connection must be installed between each of these vehicle sensors directly to the navigation processor. Since these vehicle sensors are often in different locations on the vehicle and the process of routing wires from the individual vehicle sensors to the navigation processor can be difficult.

Secondly, because the DR+SPS receiver is part of a larger system, the internal navigation data is usually not available to the rest of the automobile's systems. However, there is a need to have access to this broader level of information, for example in an integrated position and diagnostics reporting unit.

Another drawback of the traditional system described is the difficulty associated with using gyroscopes. Gyroscope operation is directionally sensitive. To properly operate, a gyroscope must be installed in a specific direction with respect to the object being measured by the gyroscope. This design parameter constrains vehicle designers with respect to how and where to install a gyroscope. This difficulty associated with the use of gyroscopes provides a drawback to location systems designed with gyroscopes.

Yet another drawback associated with the traditional system is a limitation on vehicle sensor data access. As described, data from a vehicle sensor is sent from that particular vehicle sensor over a wire to the navigation processor. The vehicle sensor data sent via the hardwire connections from each vehicle sensor to the navigation processor is not available outside of the navigation processor. This limits the application of this vehicle sensor data. The limited access to the data received by the navigation processor is an inefficiency in the traditional system.

Therefore, a need exists for new and better methods and systems for using data in SPS systems. This invention provides methods and systems for improved use of data with SPS systems.

SUMMARY OF THE INVENTION

A method for providing data to a receiver for aiding in platform location, in accord with the invention, comprises maintaining platform data on a platform data bus, collecting the platform data from the platform data bus by means of a data interface, formatting the collected platform data into a message, and providing the message to a receiver. In one embodiment the receiver is an SPS receiver.

In another embodiment of the invention, a method for synchronizing platform data with SPS data for aiding in platform location comprises receiving SPS data in a SPS receiver, tracking the time at which the SPS data is received, receiving platform data in the SPS receiver, tracking the time at which the platform data is received in the SPS receiver, and matching the SPS data with the platform data based on time.

In yet another embodiment of the invention, a system for a platform is disclosed. The system comprises a SPS receiver, SPS data, a platform data bus, platform data, and a data interface providing access between the platform data bus and the SPS receiver.

In another embodiment of the invention, a system of a platform is disclosed. The system comprises a SPS receiver, a data interface, platform data, and a platform network. The SPS receiver and the platform network exchange data via the data interface.

In another embodiment of the invention, a system of a platform is disclosed. The system comprises a SPS receiver and a platform network where the SPS receiver and the platform network are in communication.

In another embodiment of the invention, a computerized method for providing platform data from a platform data network to a SPS receiver is disclosed. The computerized method comprises, establishing communication between a platform data network and a SPS receiver, obtaining platform data from the platform data network, and providing the platform data to the SPS receiver.

In yet another embodiment of the invention, a method for providing platform data from a platform data network to a SPS receiver is disclosed. The method comprises establishing communication between a platform data network and a SPS receiver, obtaining platform data from the platform data network, and providing the platform data to the SPS receiver.

In another embodiment of the invention, a computer-readable medium having computer-executable instructions for performing a method is disclosed. The computer readable medium comprises maintaining a database of platform data, collecting the platform data with a data interface, and providing the platform data to a SPS receiver with the data interface.

In another embodiment of the invention, a location system for a platform is disclosed. The location system comprises a means for maintaining a database of platform data, a means for collecting platform data, and a means for providing the platform data to a SPS receiver.

In another embodiment of the invention, a location system for a platform is disclosed. The location system comprises a data interface, having an input and an output, a data bus containing platform data and having an input and an output, the output of the data bus connected to the input of the data interface, and a SPS receiver having an input and an output, the input of the SPS receiver connected to the output of the data bus.

In another embodiment of the invention, a computer-readable medium is disclosed. The computer readable medium having stored thereon a data structure for a message. The data structure comprises a first field containing data representing a message header, a second field containing data representing the number of valid data sets in the message, a third field containing data representing the type of data in the message, and a fourth field containing data representing values for desired vehicle sensor characteristics of interest to a SPS receiver.

BRIEF DESCRIPTION OF THE DRAWINGS

Various aspects of the invention are illustrated in the attached Figures.

DESCRIPTION OF PREFERRED EMBODIMENTS

In the following detailed description of the preferred embodiments, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and that structural, logical, and electrical changes may be made without departing from the spirit and scope of the present inventions. The following detailed description is, therefore, not to be taken in a limiting sense, and the scope of the present inventions is defined only by the appended claims.

In one embodiment of the invention a location system for a mobile platform is provided. The term "platform" refers to an end-user object. that can collect and optionally report internal data, receive SPS (and optionally DR) navigation data, and optionally can process the received data for location information. This platform typically includes the following elements: a SPS receiver, one or more sensors providing platform data to a data bus, and an interface for providing platform data from the data bus to the SPS receiver, where the system combines platform data and SPS receiver data in a processor to determine position. Examples of a platform include, but are not limited to, an automotive vehicle, a ship, a boat, an aircraft, a pedestrian, a cyclist, and a hiker.

Figure 1:
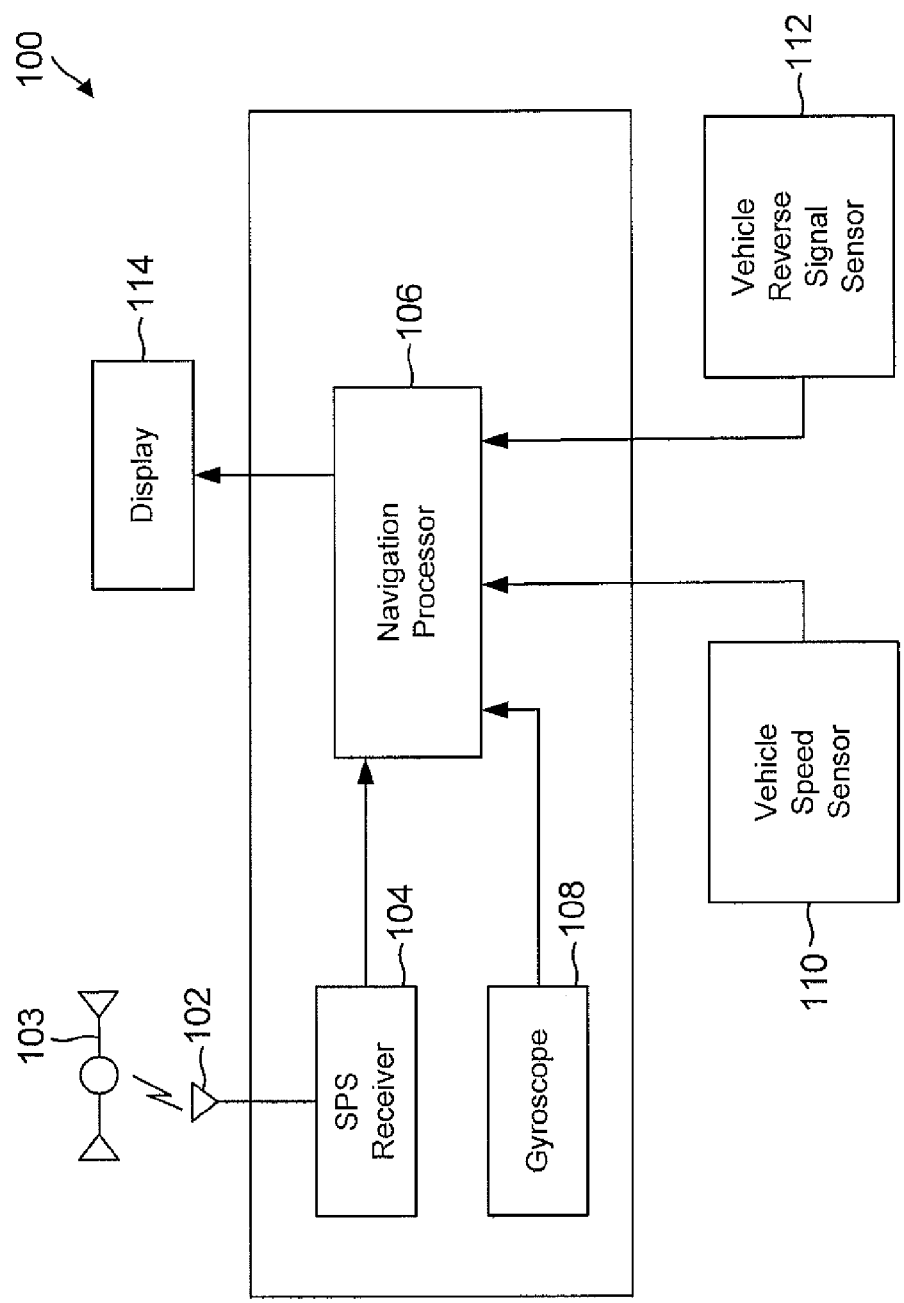
FIG. 1 is a block diagram of a prior art vehicle navigation system.
Figure 2:
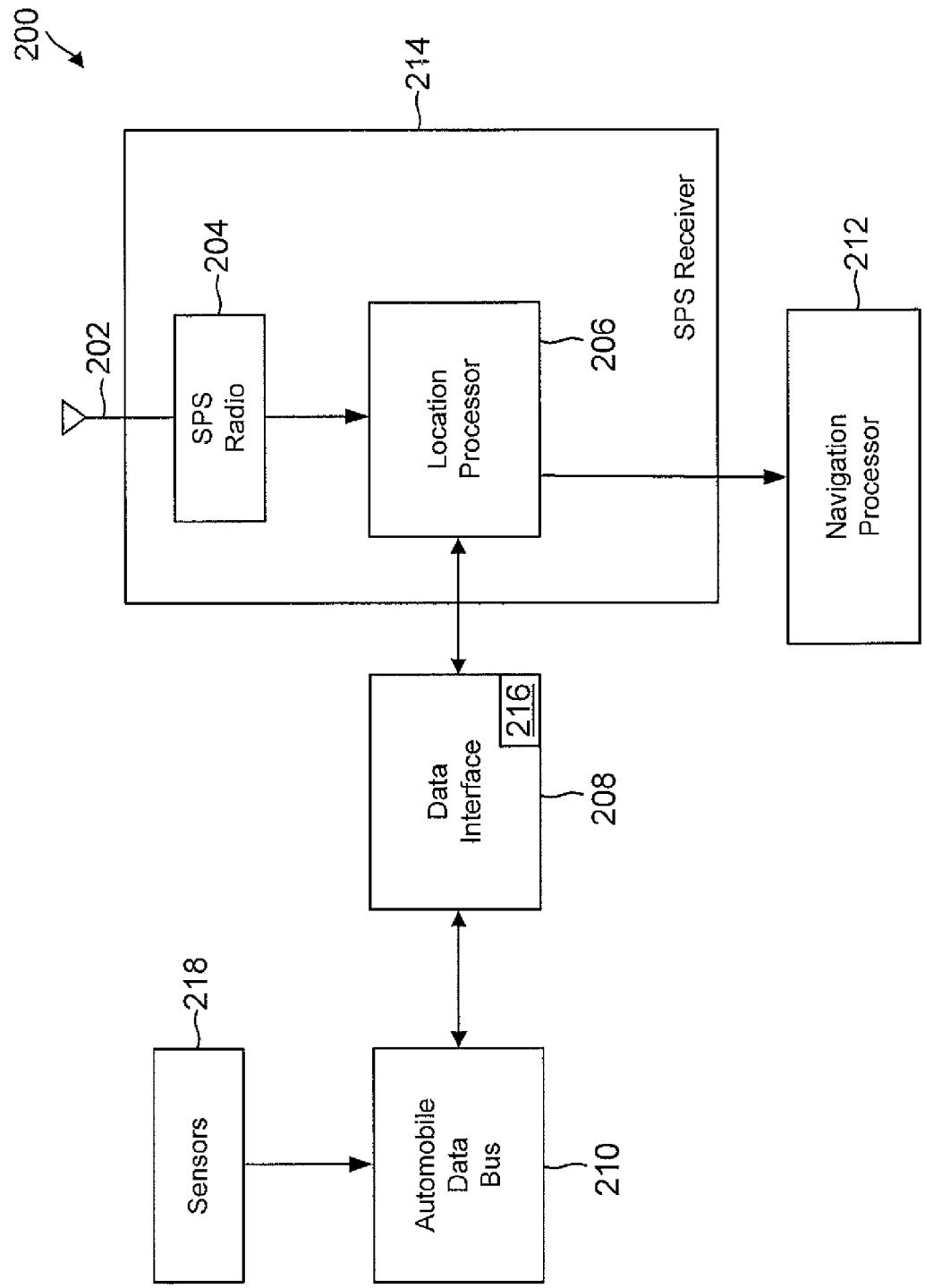
FIG. 2 is a block diagram of a vehicle navigation system, in accordance with one embodiment of the invention.

In one embodiment of the invention, the platform is an automobile vehicle (not shown). Referring to FIG. 2, an automotive vehicle navigation system 200, residing in a vehicle is provided in accordance with one embodiment of the present invention. In this embodiment, the system provides a location processor 206 with access to vehicle sensor data from a vehicle data bus 210 via a data interface 208. The automobile navigation system 200 comprises a SPS antenna 202 a data interface 208, an automobile data bus 210, a navigation processor 212, a SPS receiver 214, and a software module 216. The SPS receiver 214 comprises an SPS radio 204 and a location processor 206. The data interface 208 provides access to the platform data on the automobile data bus 210 by the SPS receiver 214.

The vehicle provides location inputs such as platform data to a processor via an interface. In this embodiment, the interface is a data interface 208. In one embodiment, the location inputs in the form of platform data include vehicle sensor data such as, for example, speed, course, direction, individual wheel pulses, etc. In one embodiment, the platform data is collected by the interface from a platform data bus. A platform data bus refers to an area or areas on a platform where data related to the platform, such as a vehicle's internal data, is collected and disseminated. An example of a platform data bus is a vehicle data bus 210. Another area where platform data can be collected and disseminated would be a data network. In one embodiment, a data network is the repository of the knowledge of a platform. In this embodiment, the platform is a vehicle and the platform data is collected and disseminated by a vehicle data bus 210.

In this embodiment, the data interface 218 provides access between the automobile data bus 210 and the location processor 206 of the SPS receiver 214. The vehicle's internal data network can be accessed by the location processor 206 via the data interface 208. In this embodiment, the data interface 208 provides access via a wired connection. In another embodiment, a data interface provides access with a wireless link. In this embodiment the data interface 208 provides the location processor 212 with access to the vehicle data bus 210. In another embodiment, a data interface provides access between a platform data bus and a navigation processor, such as navigation processor 212.

One aspect of this feature is that it solves the problem of hard wiring from a navigation processor to the vehicle sensors. Thus, in one embodiment, this invention eliminates the need for directly wired connections from vehicle sensors to a navigation processor.

A new feature of this embodiment is the functions performed by the software module 216 of the data interface 208 facilitating data transfer between the automobile data bus 210 and the SPS receiver 214. The software module 216 in the data interface 208, formats the vehicle sensor data such that the structure of the data is compatible for processing in the location processor 206. An example of such a process for data formatting is found in FIG. 14. In other embodiments, the software module 216 can perform any other processing performed by the data interface 208. In other embodiments, functions performed by the software module 216 may be performed in another area of the system 200, such as, for example in the location processor 206, the automobile data bus 210, or another area within the data interface 208, etc. The data interface 208 can also perform other synchronization between the platform data and SPS receiver data as further described in Figures below. For example the data interface 208 can perform data synchronization on characteristics, including, but not limited to physical format, collection time, etc.

The location processor 206 receives platform data, such as, for example, vehicle sensor data from the data interface 208. The data interface 208 is connected by a wire to the automobile data bus 210. The automobile data bus 210 sends vehicle sensor data across a wire to the data interface 208. In one embodiment, the vehicle sensor data is serial data. In one embodiment, the automobile data bus 210 is defined by an industry specification. Examples of such industry specifications include, but are not limited to the following: ISO-9141, Keyword 2000, CAN, J1850 PWM, and J1850 VPW. An exemplary device, which embodies the hardware of the data interface 208 is the NC1, available from Cubic Labs, Inc. of Ann Arbor, Mich.

The automobile data bus 210 maintains vehicle data from a collection of vehicle sensors 218. In one embodiment, the vehicle sensors 218 are physically connected to the automobile data bus 210 with wires. In another embodiment, the vehicle sensors 218 can be connected wirelessly, or through a network to the automobile data bus 210. The vehicle data provided by the automobile data bus can include data from the vehicle speed sensor, the reverse signal sensor, and many others. This type of sensor data can be used by the location processor 206 to assist in calculating the inertial location of the vehicle.

Further describing one embodiment of the invention, the SPS antenna 202 receives SPS signals transmitted from the SPS space vehicles orbiting the earth (not shown). The SPS signals are sent to the SPS radio 204. In the SPS radio 204 the SPS signals are converted from analog signals to digital data. The SPS digital signal is sent to the location processor 206 representing SPS range and range rate measurement data.

The location processor 206 receives two sources of data, the SPS measurement data, and the vehicle sensor data from the automobile data bus 210. These sources of data are combined and processed in the location processor 206 to provide a vehicle location solution.

Once the location processor 206 calculates a vehicle location based on the SPS measurement data and the platform data, the SPS location solution can be sent to the navigation processor 212 or some other device, such as, for example, a display (not shown). In the navigation processor 212, the SPS location solution can be further processed. Though not provided in this embodiment, a gyroscope could optionally be connected to either the location or navigation processor. In one embodiment, the SPS location solution can also be sent back to the automobile data bus 210 for transmission to other parts of the vehicle.

The data including SPS raw data and vehicle sensor data is optimally integrated to provide a vehicle location value. In other embodiments, additional directly coupled sensors can be used. This invention provides for using available vehicle sensors as well as new vehicle sensors to better determine vehicle location in conjunction with SPS and DR. For example, vehicle sensors or data gathering devices of any type may be used, even those not currently available.

In different embodiments, where the access to platform data is provided from a platform data port, a data bus, or a diagnostic unit. The access to platform data may be through a wire, a cable, a bus, through an antenna, Bluetooth, or by some other means.

In another embodiment, the navigation processor 212, with inputs from the SPS receiver 214, uses the SPS receiver and automobile sensor data in its DR algorithms. The platform data from the data interface 208 could also be used in the navigation processor 212. The result, when combined with SPS measurements and algorithms, determine as an output a vehicle location solution. The navigation processor can also provide navigation outputs. The vehicle location solution from the navigation processor 212 could be sent to the automobile data bus 210 via the SPS receiver 214. In other embodiments, the data interface 208 could be directly accessing the navigation processor 212. The vehicle location solution can then be distributed through the automotive data network to the rest of the automobile's systems, including outputs to the driver and the passengers.

In another embodiment of FIG. 2, the system utilizes platform data, such as, operational and performance state data. For example, the platform data may include, but is not limited to one or more of the following data inputs: odometer speed pulses, gyroscope heading rate, individual wheel pulses/ speed, compass heading, accelerations. In most automobiles manufactured commercially today, the vehicle data that can be accessed through the vehicle's data network. The vehicle data includes, but is not limited to: odometer speed pulses, gyroscope heading rate, individual wheel pulses/speed information, differential speed information from each axle, compass heading, accelerations, map and topological data as well as route data, doppler sensor measurements (millimetric wave radar), and steering wheel angle.

In another embodiment, the SPS system is adapted to receive this type of platform data and use it to aid in determining location. In vehicles, for example, this invention provides the capacity to obtain and use more data than only the odometer and reverse data. The SPS system uses this type of platform data in its DR algorithms, which combined with SPS measurements and algorithms can ultimately determine position, speed, heading, and more location and navigation based parameters. These processor results can then be sent to the automobile data bus 210 and distributed back through an automotive data network to the rest of the automobile's systems. The processor results can also be sent out of the vehicle to another independent system.

In another embodiment, the SPS system utilizes the various vehicle data sources from the automobile data bus 210 and the SPS antenna 202 to determine the most accurate platform data available for location calculation. Thereby, ease of integration into multiple automotive platforms is allowed.

In another embodiment, the data interface 208 interrogates various vehicle data sources from the automobile data bus 210 and self-configures to access and utilize the available vehicle data. This enables one SPS system to be manufactured and installed across a range of different manufacturer's vehicles, as well as across one manufacturer's different series or models. Using a vehicle data bus to gather platform data allows optimization of the platform data.

In another embodiment, the data interface 210 searches for available platform data from the automobile data bus 210 and determines what is available and relevant to conduct Dead Reckoning or other location and navigation algorithms. As not all vehicles will have the same sensors available, this invention can optimize what is available. In another embodiment, the invention will scan what is available and optimize the calculations tailored to the available data on a particular vehicle. Different vehicle lines or option packages may have different vehicle sensors. For example, a particular vehicle model could come with a package containing traction control having certain sensors not available or activated on the package without traction control.

In another embodiment, the system observes which sensors are available and intelligently uses them. Therefore, this embodiment of the system would accommodate different vehicles with different sensor configurations.

In another embodiment, the system eliminates the need for a gyroscope by accessing other vehicle sensor data via the automobile data bus that provide heading rate. In one embodiment, the heading rate can be derived by differencing the individual wheel pulses for wheels on a common axle. A sensor can be placed on each tire to record wheel pulses. Each of these sensors can be connected to the automobile data bus. The wheel pulse data from each tire can be sent from these sensors to the automobile data bus. A processor can then receive the wheel pulse data from the automobile data bus. The processor can then difference the individual wheel pulse data from wheels on a common axle to calculate the heading rate. In this embodiment, the gyroscope becomes optional.

In another embodiment, the gyroscope is included. In the gyroscope enabled embodiment, the gyroscope data is provided to a processor either as data from a bus, or via a direct wire connection. In another embodiment, the gyroscope data is provided to a location processor. In yet another embodiment, the gyroscope data is provided to a navigation processor.

Another embodiment of the invention provides greater access to internal navigation data. As the SPS system has access to the platform data bus via the data interface 208, the vehicle data bus 210 similarly has access to the data from the SPS system. Obtaining vehicle sensor data from a platform data bus allows access to the platform data by other parts of the vehicle, thus making the platform data residing in the platform data bus available to the entire vehicle, in one embodiment. Also, data from the location processor 206, such as the SPS based solution can be sent to the platform data bus. The data on the platform data bus can be read across the entire vehicle network.

Descriptions herein use GPS receivers by way of illustration and exemplification, and not limitation. Though some embodiments are described with GPS receivers, the invention is not limited to GPS receivers only, and encompasses any type of satellite positioning system (SPS).

Descriptions herein use vehicles by way of illustration and exemplification, and not limitation. Though some embodiments are described with vehicles, the invention is not limited to vehicles only, and encompasses any type of platform that may utilize SPS. This description herein uses automobile data buses by way of illustration and exemplification, and not limitation. Though some embodiments are described with automobile data buses, the invention is not limited to automobile data buses only, and can encompass any type of data bus or collection point for data. In further embodiments, more than one data bus can be utilized.

Figure 3:
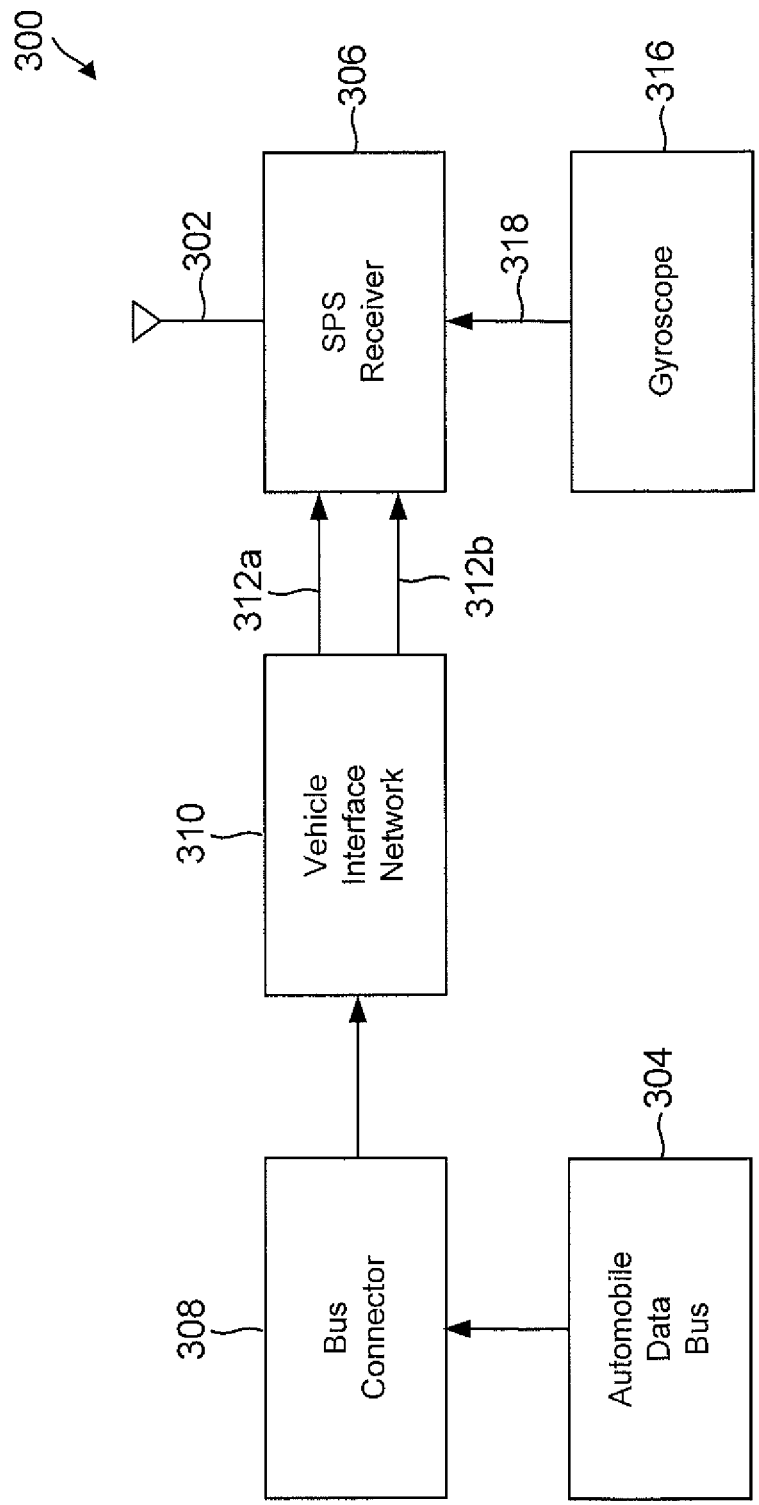
FIG. 3 is a block diagram of a vehicle location system, in accordance with one embodiment of the invention.

Referring to FIG. 3, an automobile location system 300 is provided in accordance with one embodiment of the present invention. The automobile location system comprises a SPS antenna 302, a vehicle data bus 304, a SPS receiver 306, a bus connector 308, a vehicle interface network (VIN) 310, reverse signal wire 312a, vehicle speed signal wire 312b, and a gyroscope 316. Various embodiments of SPS receiver 306 are further described in FIGS. 4 and 5.

The SPS antenna 302 receives SPS signals transmitted from the SPS satellites (not shown). In one embodiment, the SPS antenna 302 is a model AT575-6 available from AeroAntenna Technology, Inc. The SPS signals are sent to the SPS receiver 306. In the SPS receiver 306 the SPS signals are converted from analog to digital data representing SPS measurement data.

Many sensors currently exist on a vehicle. These sensors are increasingly being used to assist in monitoring vehicle emissions, component performance, and component failures. The On Board Diagnostic System II (OBDII) is a system providing monitoring of vehicle emission component performance. This system was created to comply with government regulation of vehicle emissions. The OBDII unit is one example of an automobile data bus.

An automobile data bus 304 is connected to a bus connector 308 by a wire. In one embodiment, the automobile data bus 304 is an OBD II unit. In one embodiment, the automobile data bus 304 complies with one of the following protocols: 1850-9141, Keyword 2000, CAN, J1850 PMW, and J1850 VPW. In one embodiment of the bus connector 308 is a standard connector. The automobile data bus 304 sends vehicle sensor signals across the wire to the bus connector 308. The bus connector 308 is connected to the vehicle interface network 310. The vehicle interface network 310 receives vehicle sensor data from the bus connector 308. In one embodiment, the vehicle interface network 310 is a FleetRecorder from Cubic Labs. The vehicle interface network 310 is connected to the SPS receiver 306. The SPS receiver 306 receives vehicle sensor signals from the vehicle interface network 310. In one embodiment, the SPS receiver 306 is a SiRFStar2e/LP from SiRF Technologies, Inc.

In this embodiment, reverse signal wire 312a and vehicle speed signal wire 312b provide a signal interface 312. The signal interface 312 provides signals from the vehicle interface network 310 to the SPS receiver 306. Across the reverse signal wire 312a the SPS receiver 306 receives the reverse signal of the vehicle. Across the vehicle speed signal wire 312b the SPS receiver 306 receives the vehicle's odometer signal. In another embodiment, the vehicle interface network 310 can send digital data to the SPS receiver 306 via one or more serial data lines. In yet another embodiment, the vehicle interface network 310 can send digital data to the SPS receiver 306 via one or more parallel data lines.

In this embodiment, the automobile data bus 304 maintains vehicle sensor information, in the form of signals from a collection of vehicle sensors. In one embodiment, the vehicle sensors (not shown) are physically connected to the automobile data bus 304 with wires. The sensors tracked by the automobile data bus 304 can include the vehicle speed sensor, the reverse signal sensor, and many others. In this embodiment, the gyroscope 316 provides gyroscope data or signals to the SPS receiver 306. The gyroscope 316 is connected to the SPS receiver 306 by a wire 318. In one embodiment, the gyroscope 316 is a Murata ENV-05. In another embodiment, the gyroscope 316 is a Panasonic EWTS. From all of the signals received the SPS receiver 306 can calculate the inertial position of the vehicle, provided as a SPS based location solution.

In this embodiment, the SPS receiver 306 receives three sources of inputs, the SPS signals from the SPS antenna 302, the vehicle sensor signals from the signal interface 312, and heading rate information from the gyroscope 316. These inputs are processed in the SPS receiver 306 to provide a SPS based location solution. Once the SPS receiver 306 calculates a vehicle location based on the SPS measurement data, the gyroscope input, and the vehicle sensor signals, the SPS based location solution can be sent to a display (not shown). The SPS solution can also be sent back to the automobile data bus 304 via the VIN 310 and the bus connector 308, for transmission to other parts of the vehicle.

Another feature of the invention is that in one embodiment, it provides greater access to internal SPS system data. As the SPS receiver 306 has access to the contents of the automobile data bus 304, via the VIN 310 and the bus connector 308, the automobile data bus 304 similarly has access to the data from the SPS receiver 306. Obtaining vehicle sensor signals from an automobile data bus 304 with the vehicle interface network 310 allows access to the vehicle sensor data by other parts of the vehicle. This makes the information residing in the automobile data bus 304 available to the entire vehicle. Also, data from the SPS receiver 306, such as the SPS based location solution can be sent to the automobile data bus 304. The signals and data on the automobile data bus 304 can be available to read across the entire vehicle network.

Figure 4:
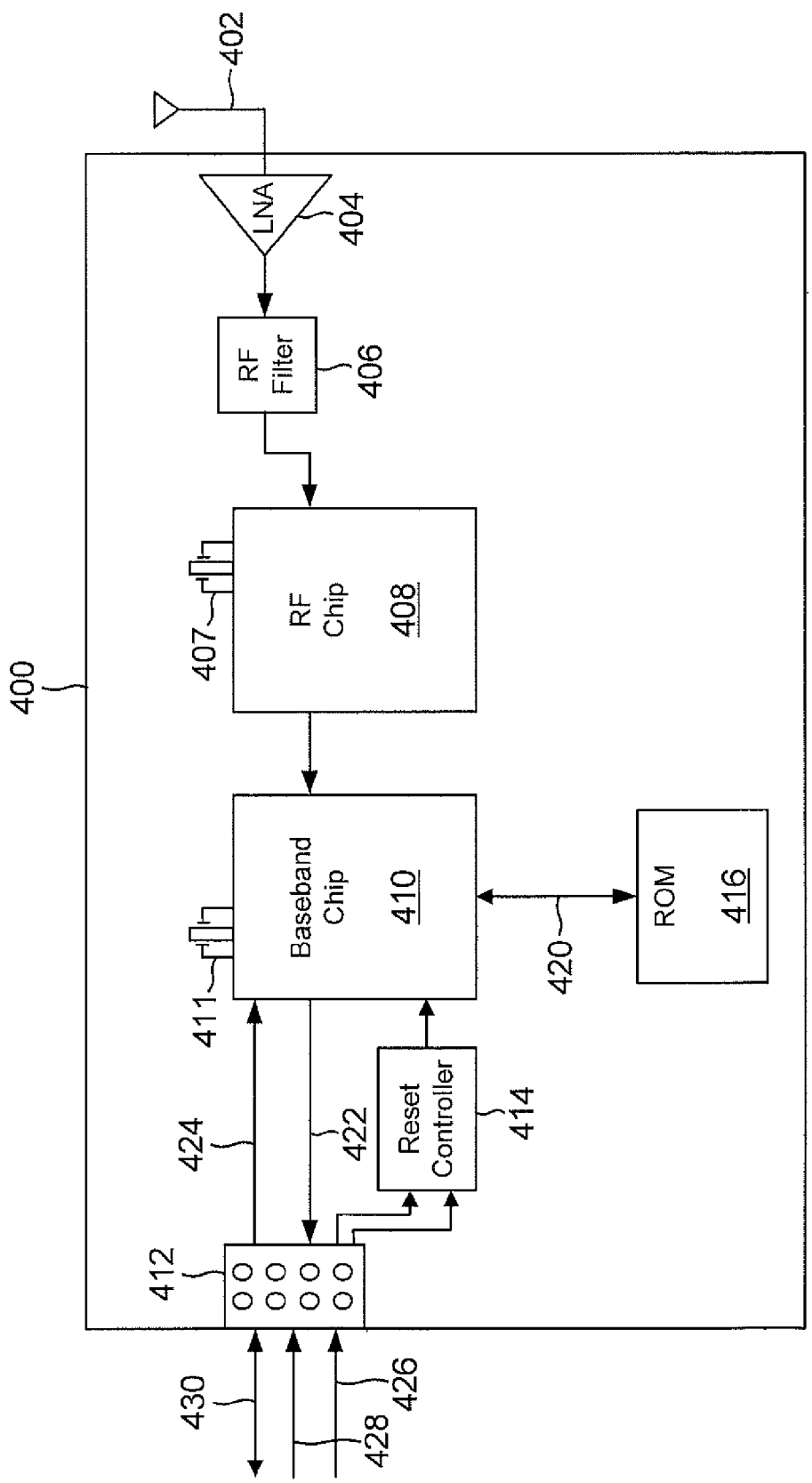
FIG. 4 is a block diagram of a SPS receiver and associated components, in accordance with one embodiment of the invention.

Referring to FIG. 4, a SPS receiver 400 is shown in simplified form. The SPS receiver 400 includes several components, some of which are described herein. The SPS antenna 402, external to the SPS receiver 400, sends data to a low noise amplifier (LNA) 404. The LNA 404 is optional. The LNA 404 sends the SPS measurement data to a radio frequency (RF) filter 406. After filtering, SPS data is sent to an analog RF Chip 408 which receives and demodulates the incoming SPS data. The RF Chip 408 contains a reference crystal (REF XTAL) 407. The LNA 404, the RF filter 406, and the RF Chip 408 performs as an SPS radio, such as, for example, SPS radio 204 as shown in FIG. 2.

The SPS data is then sent to the digital Baseband Chip 410. An RF chip which embodies the functionality of the RF Chip 408 is the SiRFstar GRF2i/LP, part no. GRF2i/LP-0214, which is available from SiRF Technology, Inc. of San Jose, Calif. A baseband chip which embodies the functionality of the Baseband Chip 410 is the GSP2e/LP, part number GSP2E/LP-7460 which is available from SiRF Technology, Inc. The Baseband Chip 410 typically comprises an ARM7 processor (not shown). The Baseband Chip 410 can receive and send serial data across line 424 as well as send out timemarks across line 422 through Pins 412. The Baseband Chip 410 contains a real time clock crystal (RTC XTAL) 411. The Baseband Chip 410 receives its electric power from an external source (not shown). Power from an external battery source is sent across lines 428, 426 through the Pins 412 to a reset controller 414. The electric power is sent from the reset controller 414 to the Baseband Chip 410. In one embodiment, serial line 430 can receive serial data from a data interface, such as data interface 208 as shown in FIG. 2.

The Baseband Chip 410 processes digital data, such as the SPS data sent from the RF Chip 408 and serial data received from outside the SPS receiver 400. ROM 416 is included in the SPS receiver 400. The RAM (not shown) is optionally included in the SPS receiver 400. An address bus communicates across line 420 between the Baseband Chip 410 and the ROM 416. The Baseband Chip 410 and the ROM 416 provide the main components for a location processor, such as, for example, location processor 206 as shown in FIG. 2.

Figure 5:
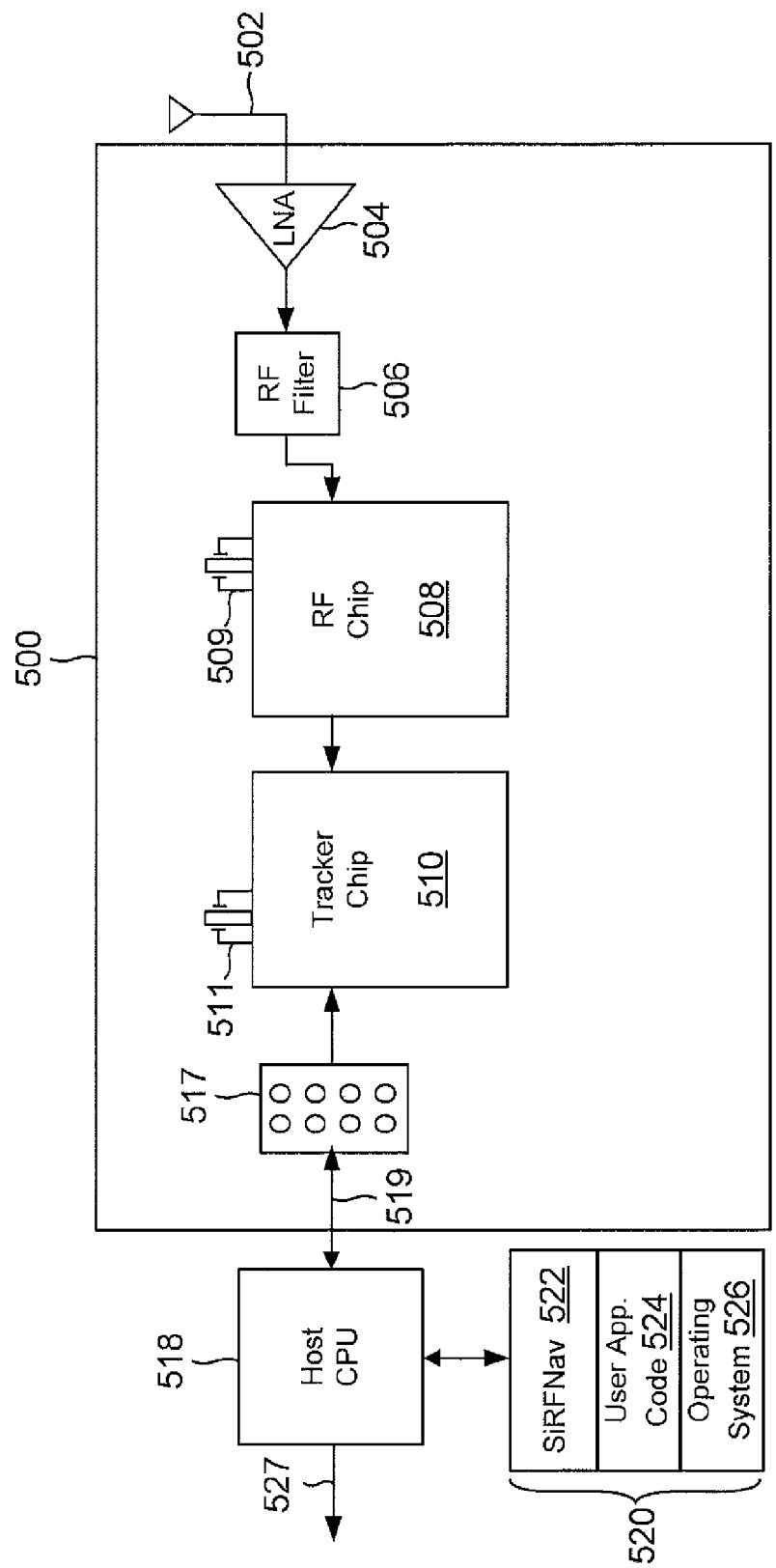
FIG. 5 is a block diagram of a SPS receiver and associated components, in accordance with one embodiment of the invention.

One embodiment of the present invention is implemented using a host based SPS solution. Referring to FIG. 5, a SPS system showing a SPS receiver 500 with a related host processor system is shown in a simplified form. The SPS receiver 500 includes several components, some of which are described herein. The SPS antenna 502, external to the SPS Receiver 500, sends data to a low noise amplifier (LNA) 504. The LNA 504 is optional. The LNA 504 sends the SPS measurement data to a radio frequency (RF) filter 506 for filtering. The filtered SPS data is sent to an analog RF Chip 508. The RF chip 508 features GPS clocks (not shown) and a Reference crystal (REF XTAL) 509. The LNA 504, the RF filter 506, and the RF Chip 508 perform as a SPS radio, such as, for example, SPS radio 204 as shown in FIG. 2.

The SPS data is then sent to a digital Tracker Chip 510. An RF chip which embodies the functionality of the RF Chip 508 is the SiRFstar GRF2i/LP, part no. GRF2i/LP-0214, which is available from SiRF Technology, Inc. of San Jose, Calif. A baseband chip, which embodies the functionality of the Tracker Chip 510, is the GPS2t, part number GPS2t-7206, which is available from SiRF Technology, Inc. The Tracker Chip 510 provides a main component for a location processor, such as, for example, location processor 204 as shown in FIG. 2. Because the Tracker Chip 510 has limited processing capability, it works in conjunction with a host central processing unit (CPU) 518. The host central processing unit (CPU) 518 can be a navigation processor The Tracker Chip 510 has an optional real time clock (RTC) XTAL 511. The Tracker Chip can receive and send serial data across a line 519 through pins 517 from and to the host CPU 518.

In one embodiment the host CPU 518 processes SiRFNav software. The SiRFNav software 522 resides in Flash memory 520 along with the User Application Code 524 and an Operating System 526. In one embodiment, User Application Code 524 can receive data from a data interface, such as data interface 208 as shown in FIG. 2. The following are a few methods and systems for implementing a host based SPS solution: U.S. patent application Ser. No. 10/199,253, filed Jul. 18, 2003, entitled "Tracker Architecture for SPS Systems," by Nicolas Vantalon et al.; U.S. patent application Ser. No. 10/269,914, filed Oct. 10, 2002, entitled, "Host Based Satellite Positioning Systems," by Clifford Yamamoto, et al.; application Ser. No. 10/269,105, filed Oct. 10, 2002, titled, "Layered Host-based satellite positioning solutions," by Clifford Yamamoto, et al.; and U.S. patent application Ser. No. 10/269,104, filed Oct. 10, 2002, entitled "Navigation Processing in Host Based Satellite Positioning Solution," by Clifford Yamamoto, et al. All of which are incorporated by reference herein in their entirety.

The host CPU 518 can also receive external data. For example, a connection can be made from an external automobile data bus (not shown) to the host CPU 518. Data can be sent to the host CPU from an vehicle data bus. In another embodiment vehicle data can be sent to the SPS receiver 500. This data can be processed along with data received from the Tracker Chip 510 to produce a location result. The resulting location result can be sent to a GUI (not shown) across line 527.

Figure 6:
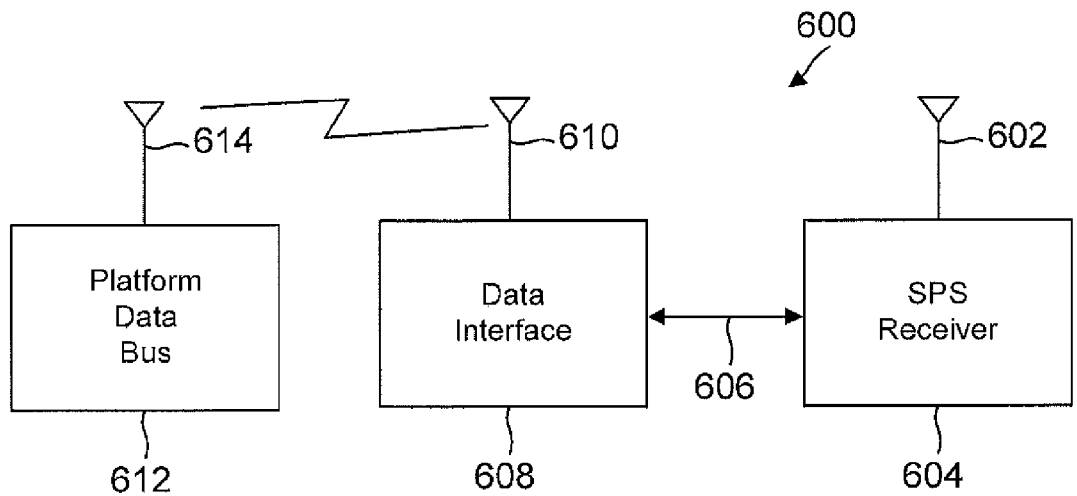
FIG. 6 is a block diagram of a platform location system, in accordance with one embodiment of the invention.

Referring to FIG. 6, a platform location system 600 is provided in accordance with one embodiment of the present invention. The platform location system comprises a SPS antenna 602, a SPS receiver 604, a wire 606, a data interface 608, a data interface antenna 610, an platform data bus 612, and a platform data bus antenna 614.

In one embodiment, the SPS receiver 604 is DR capable. The data interface 608 is directly coupled to the SPS receiver 604. In one embodiment, the SPS antenna 602, the SPS receiver 606, the wire 606, and the data interface 608 are integrated into a single package. This single package has access to vehicle data through the data interface 608.

The SPS antenna 602 receives SPS signals transmitted from the SPS satellites (not shown). The SPS signals are sent to the SPS receiver 604. In the SPS receiver 604 the SPS signals are converted from analog to digital signals and represent SPS measurement data.

A platform data bus 612 provides data wirelessly through a platform data bus antenna 614. The platform data bus 612 maintains platform data from a collection of vehicle sensors. In one embodiment, the platform sensors (not shown) are physically connected to the platform data bus 612 with wires. In one embodiment where the platform is a vehicle, the platform sensors tracked by the platform data bus 612 can include the vehicle speed sensor, the reverse signal sensor, and many others, as discussed above. From this sensor data the SPS receiver 604 can calculate the inertial position of the platform.

The data interface antenna 610 receives platform sensor data from the platform data bus 612. The data interface antenna 610 provides the platform sensor data to the data interface 608. The data interface 608 is connected to the SPS receiver 604 by a wire 606. The SPS receiver 604 receives platform sensor data from the data interface 608 across wire 606.

Using the platform data bus 612 allows optimization of the platform sensor data. The data interface 608 searches for available platform data on the platform data bus 612 and determines what is available and relevant to the location calculations. As not all platforms will have the same sensors available, this invention can optimize what is available.

In some of the embodiments of the invention, where the platform is a vehicle, the need for a gyroscope is eliminated by accessing other vehicle sensor data via the automobile data bus 612 that provide heading rate, as discussed above. In one embodiment, the heading rate can be derived from the differential wheel pulses. In this embodiment, a sensor can be placed on each tire to record wheel pulses. Each sensor can be connected to the platform data bus 612. The wheel pulse data from each tire can be sent from these sensors to the platform data bus 612. The SPS receiver 604 can read the wheel pulse data from the platform data bus 612 via the data interface 608. The SPS receiver 604 can use the wheel pulse data to calculate the heading rate. Thus, in this embodiment, a gyroscope becomes optional.

So the SPS receiver 604 receives two sources of data, the SPS measurement data and the platform sensor data from the data interface 608. These sources of data are combined and processed in the SPS receiver 604 to provide a platform location result.

Once the SPS receiver 604 calculates a platform location based on the SPS measurement data and the platform sensor data, the platform location solution can be sent to a display (not shown). The platform location solution can also be sent back to the platform data bus 612 via the data interface and the associated antennas for transmission to other parts of the platform.

Another feature, in some embodiments of the invention, is greater access to internal SPS system and navigation data. As the SPS receiver 604 has access to the platform data bus 612, the platform data bus 612 similarly can be provided access to data from the SPS receiver 604. Obtaining platform sensor data from a platform data bus 612 with the data interface 608 allows access to the platform sensor data by other parts of the platform. This feature makes the platform data residing in the platform data bus 612 available to the entire platform. Also, data from the SPS receiver 604, such as the SPS based location solution can be sent to the platform data bus 612. The data on the platform data bus 612 can be read across the entire platform network. In one embodiment the platform network is a vehicle's internal network.

In embodiments of the invention where the data interface 608 communicates to the platform data bus 612 wirelessly, the data interface 608, and the SPS receiver 604 portion of the system can be collocated from the platform. For example, the SPS antenna 602, the SPS receiver 604, the wire 606, the data interface 608, and the data interface antenna 610 can collectively form one receiver system. This receiver system can be placed in a cellular phone, a laptop computer, a pda, or some other system facilitating a wireless connection with the platform data bus 612.

In other embodiments, the platform data bus 612 is an automobile data bus. In one embodiment, the platform data bus 612 is an OBD II unit. In other embodiments, different intermediate devices could be provided between the platform data bus 612 and the data interface 608, such as, for example, OBD II connectors, wires, etc. In still further embodiments, the information represented by the platform sensor data can be sent in a format other than as digital data. For example, the data could be sent as analog signals or serial data.

Figure 7:
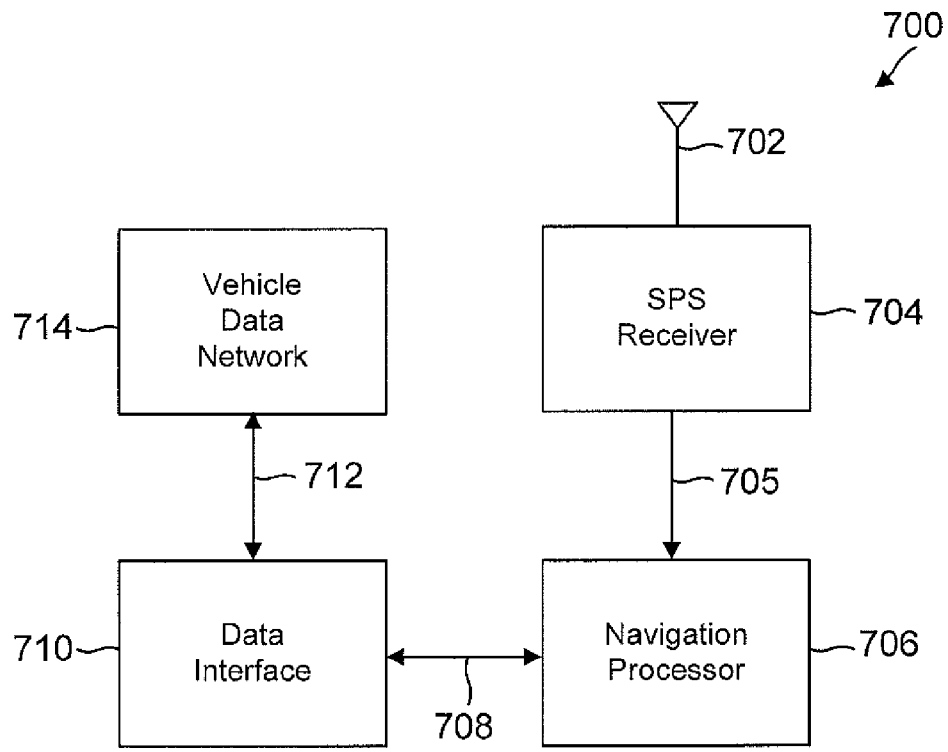
FIG. 7 is a block diagram of a vehicle navigation system, in accordance with one embodiment of the invention.

Referring to FIG. 7, a platform navigation system 700 is provided in accordance with one embodiment of the present invention. The platform navigation system comprises a SPS antenna 702, a SPS receiver 704, a wire 705, a navigation processor 706, a wire 708, a data interface 710, a wire 712, and a vehicle data network 714.

The SPS antenna 702 receives SPS signals transmitted from the SPS satellites (not shown). The SPS signals are sent to the SPS receiver 704. In the SPS receiver 704, the SPS signals are converted from analog to digital signals and represent SPS measurement data. The SPS measurement data is further processed in the SPS receiver 704 to produce a location result. The location result is sent from the SPS receiver 704 to the navigation processor 706 across a wire 705.

The vehicle data network 714 collects and stores vehicle data. In one embodiment, the vehicle sensors (not shown) are physically connected to a data bus from which the vehicle data network 714 receives the vehicle data. The vehicle data can include many different vehicle sensor data such as, for example, the vehicle speed sensor, the reverse signal sensor, and many others. This vehicle data can be used by a location or navigation processor to calculate the inertial location of the vehicle.

The vehicle data from the vehicle data network 714 is sent across a wire 712 to the data interface 710. The data interface 710 is connected to the navigation processor 706 with a wire 708. The data interface 710 sends vehicle data over the wire 708 to the navigation processor 706. The navigation processor 706 processes the vehicle data and the location result from the SPS receiver 704 to provide an inertial location of the platform from the navigation processor 706.

Using the vehicle data network 714 allows optimization of the vehicle data. In one embodiment, the data interface 710 searches for available vehicle data on the vehicle data network 714 and determines what is available and relevant to location calculations. As not all vehicles will have the same data available, some embodiments of the invention can optimize the available data.

Some embodiments of the invention eliminate the requirement for a gyroscope by accessing other vehicle data via the vehicle data network 714 that provide heading rate. The heading rate can be derived from the differential wheel pulses as discussed above.

In this embodiment, the navigation processor 706 receives two sources of data, the SPS receiver data and the vehicle data from the data interface 710. These sources of data are combined and processed in the navigation processor 706 to provide an inertial location of the vehicle from the navigation processor 706.

Once the navigation processor 706 calculates an inertial location of the vehicle, this data can be sent to a display (not shown). The inertial location data can also be sent back to the data interface 710 for transmission to other parts of the vehicle.

Another feature of some embodiments of this invention is that it provides greater access to internal navigation and SPS data. As the navigation processor 706 has access to the vehicle data network 714, the vehicle data network 714 similarly has access to the data from the navigation processor 706. Obtaining vehicle data from the vehicle data network 714 with the data interface 710 allows access to the vehicle data by other parts of the vehicle thus making the data residing in the vehicle data network 714 available to the entire vehicle. In another embodiment, a wireless interface is provided between a navigation processor and an automobile data bus.

Figure 8:
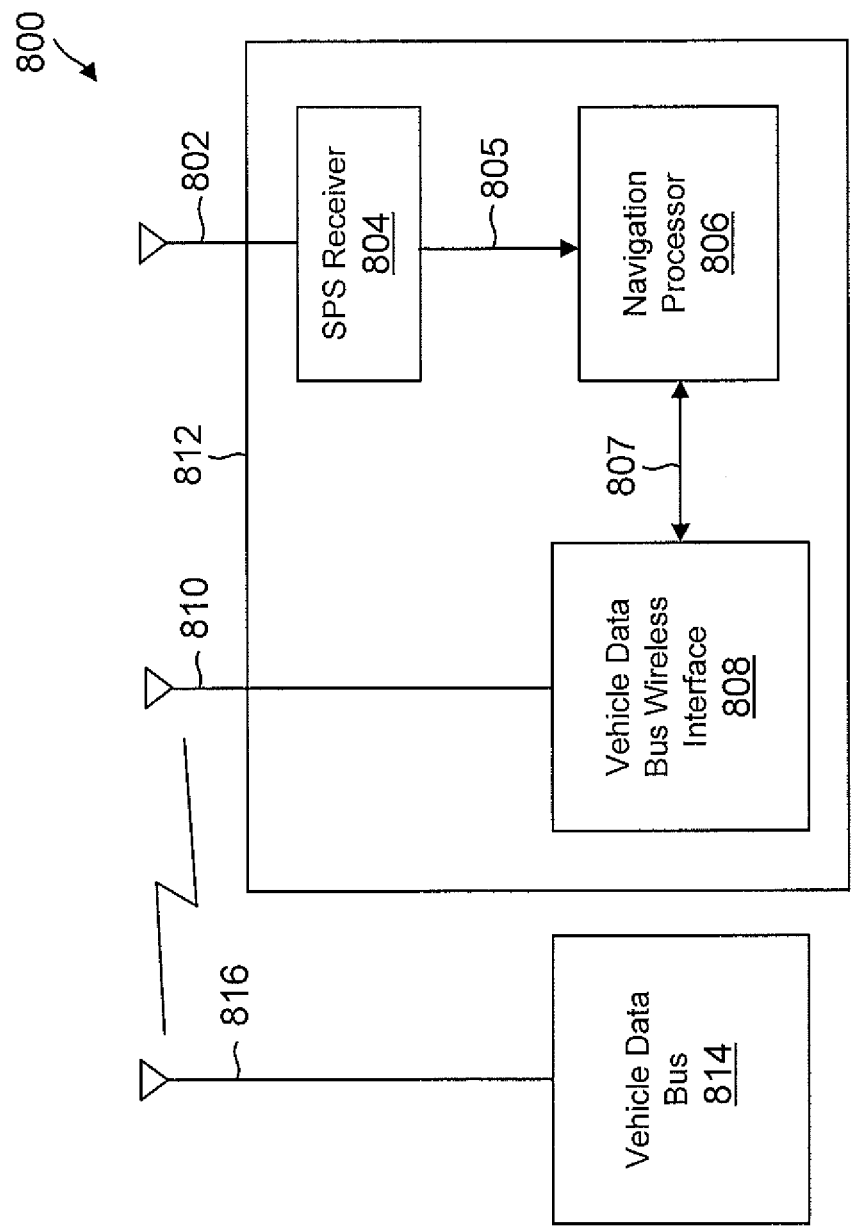
FIG. 8 is a block diagram of a vehicle navigation system, in accordance with one embodiment of the invention.

Referring to FIG. 8, a vehicle navigation system 800 is provided in accordance with one embodiment of the invention. The vehicle navigation system comprises a SPS antenna 802, a SPS receiver 804, a wire 805, a navigation processor 806, a wire 807, a vehicle data bus wireless interface 808, a vehicle data bus wireless interface antenna 810, a vehicle data bus 814, and a vehicle data bus antenna 816. The vehicle data bus wireless interface 808, a vehicle data bus wireless interface 808, the navigation processor 806, the SPS receiver 804, the SPS antenna 802, and the associated connections comprise a SPS system 812. The SPS system 812 receives vehicle data inputs and provides the location of the vehicle as an output of the navigation processor 806.

The SPS antenna 802 receives SPS signals transmitted from the SPS satellites (not shown). The SPS signals are sent to the SPS receiver 804. In the SPS receiver 804 the SPS signals are converted from analog to digital signals and processed in a location processor (not shown). The SPS receiver data is sent to the navigation processor 806 across a wire 805.

The navigation processor 806 receives vehicle data from the vehicle data bus wireless interface 808. The vehicle data bus wireless interface 808 has an vehicle data bus wireless interface antenna 810 that receives signals sent from the vehicle data bus 814. The vehicle data bus 814 sends vehicle data from the vehicle data bus antenna 816 to vehicle data bus wireless interface antenna 810. The vehicle data bus wireless antenna 808 receives the vehicle data from the vehicle data bus wireless interface antenna 810. The vehicle data bus wireless interface 808 sends the vehicle data to the navigation processor 806 across a wire 807. In one embodiment, the vehicle data bus wireless interface 808 is a Bluetooth transceiver. In another embodiment, the vehicle data bus wireless interface 808 uses a WiFi transceiver. In another embodiment, the vehicle data bus wireless interface 808 uses an infrared transceiver.

In one embodiment, the vehicle data bus 814 maintains vehicle data from a collection of vehicle sensors. The vehicle sensors are physically connected to the vehicle data bus 814 with wires (not shown). The sensors tracked by the vehicle data bus 814 can include the vehicle speed sensor, the reverse signal sensor, and many others.

In this embodiment, the navigation processor 806 receives two sources of data, the SPS receiver data, and the vehicle data from the vehicle data bus 814 (received via the automobile data bus wireless interface 808). With this data, the navigation processor can calculate the inertial location of the vehicle. These sources of data are combined and processed in the navigation processor 806 to provide a vehicle location solution.

Once the navigation processor 806 calculates a vehicle location based on the SPS receiver data and the vehicle data from vehicle data bus 814, the vehicle location solution can be sent to a display, a modem, or some other device (not shown). In some embodiments, the vehicle location solution can also be sent back to the vehicle data bus 814 via the vehicle data bus wireless interface 808 for further transmission to other parts of the vehicle.

In embodiments of the invention where the vehicle data bus interface 808 is wireless, the SPS system 812 can be collocated from the vehicle. For example, the SPS system 812 can be located in a cellular phone, a laptop computer, a personal digital assistant, or some other system facilitating a wireless connection with the vehicle data bus 814.

Figure 9:
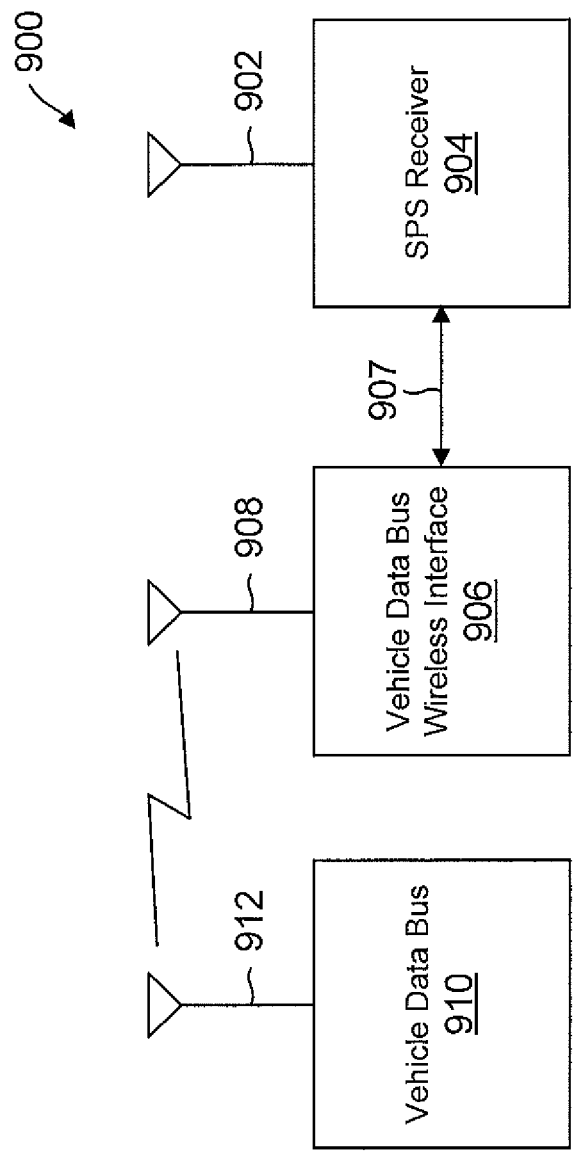
FIG. 9 is a block diagram of a vehicle location system, in accordance with one embodiment of the invention.

Referring to FIG. 9, a vehicle location system is provided, in accordance with one embodiment of the invention. The vehicle location system comprises a SPS antenna 902, a SPS receiver 904, a wire 907, a data interface antenna 908, a vehicle data bus 910, and a vehicle data bus antenna 912. The SPS antenna 902 receives SPS signals transmitted from the SPS satellites (not shown). The SPS signals are sent to the SPS receiver 904. In the SPS receiver 904 the SPS signals are converted from analog to digital signals providing SPS measurement data to be processed.

The vehicle data bus 910 maintains vehicle data from a collection of vehicle sensors. The sensors tracked by the vehicle data bus 910 can include vehicle speed sensor, the reverse signal sensor, and many others. The vehicle data bus 910 sends vehicle data via the vehicle data bus antenna 912 to the vehicle data bus wireless interface antenna 908. The vehicle data bus wireless interface 906 receives vehicle data sent from the vehicle data bus 910 to the vehicle data bus wireless interface antenna 908. The vehicle data is sent from the vehicle data bus wireless interface 906 to the SPS receiver 904 over wire 907. In one embodiment, the vehicle data bus wireless interface 906 uses Bluetooth to communicate with SPS receiver 904. In another embodiment, the vehicle data bus wireless interface 906 uses WiFi. In another embodiment, the vehicle data bus interface 906 uses infrared. The SPS receiver 904 receives two sources of data, the SPS measurement data, and the vehicle data from the vehicle data bus 910. These sources of data are combined and processed in the SPS receiver 904 to provide a vehicle location solution.

Once the SPS receiver 904 calculates a vehicle location solution, the vehicle location solution and related data can be sent to a data display (not shown). In other embodiments, the vehicle location solution can be sent to a modem or to some other device. The vehicle location solution can also be sent back to the vehicle data bus 910 via the vehicle data bus antenna 912 for further transmission to other areas of the vehicle.

Figure 10A:
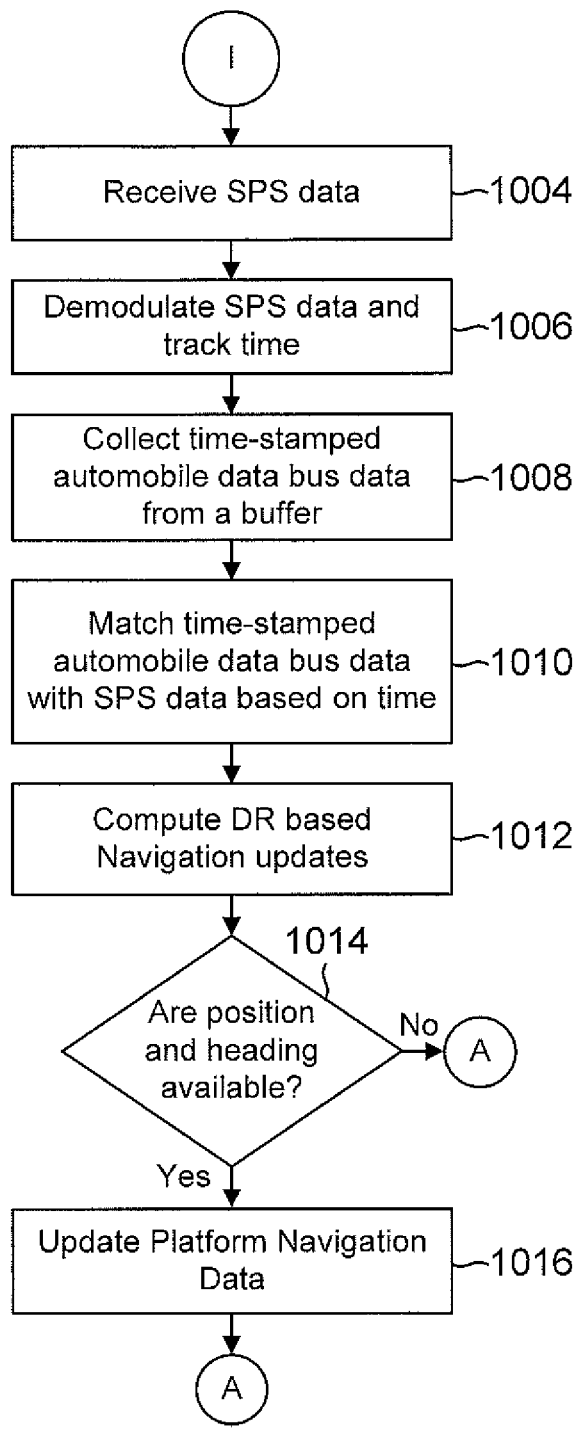
FIG. 10A, B represent a high level flow chart for a process for processing SPS data and automobile data bus data in an automobile, in accordance with one embodiment of the invention.

FIG. 10 is a high level flow chart for a process for processing SPS data and automobile data bus data in an automobile, in accordance with one embodiment of the invention. The flowchart depicts one cycle in the process. The software requires that SPS data be received in block 1004. The SPS data is demodulated and the time is tracked at block 1006. Depending on the embodiment, the SPS data could be GPS signals, or some other SPS signal. In one embodiment, the SPS signals would be received in a SPS receiver, such as SPS receiver 214 shown in FIG. 2. In one embodiment, the SPS data would be demodulated in a RF filter of a SPS receiver.

At block 1008 time-stamped automobile data bus data is collected from a buffer. In one embodiment, the time-stamped automobile data bus data is collected by a data interface, such as data interface 208 shown in FIG. 2. The time-stamped automobile data bus data has a time stamp from the automobile data bus indicating when it was collected by the automobile data bus from a respective sensor. In another embodiment, the time stamp on the automobile data bus data indicates when the automobile data bus data was collected in a buffer. In yet another embodiment, the time stamp on the automobile data bus data indicates when the automobile data bus was collected in a data interface.

The automobile data bus time-stamped data is stored in a buffer. In one embodiment the buffer is in a data interface. In one embodiment, the buffer is located in memory. In one embodiment, the memory is in a data interface. When the time-stamped automobile data bus data is needed in the cycle, the time-stamped automobile data bus data is collected from the buffer.

At block 1010, the time-stamped automobile data bus data is matched with the SPS data based on time. In one embodiment, the matching is done by a data interface. In another embodiment, the matching is done by a SPS receiver. In this embodiment, the matching done in block 1010 by the data interface is based on comparing the time-stamp of the automobile data bus data to the time at which the SPS data is demodulated in the SPS receiver. SPS data in a receiver typically has time values associated with it, such as, for example, the time at which the SPS data is collected in the SPS receiver, a time at which SPS data is posted as measurement data by an SPS receiver. These times are typically tracked by internal counters and clocks in an SPS receiver. In another embodiment, the matching done in block 1010 by the data interface is based on comparing the time stamp of the automobile data bus data to the time at which the SPS data is posted by the SPS receiver as measurement data. In another embodiment, the matching in block 1010 is done based on comparing the time stamp of the automobile data bus data to the time at which the SPS data is collected in the SPS receiver. The time at which the SPS data is collected can be tracked at different points depending on the SPS receiver. For example, the SPS data can be tracked as it is collected from the SPS antenna or when it is demodulated in the SPS receiver.

This matching can be done asynchronously or synchronously. One example of asynchronous matching is provided in FIG. 12. In one embodiment the time-stamped automobile data bus data is matched to the SPS data based on the time at which the SPS data was collected. In another embodiment, the time-stamped automobile data bus data is matched to the SPS data based on the time at which the SPS data is posted by the SPS receiver.

The DR-based navigation updates are computed (Block 1012). In one embodiment, the calculations take place in a SPS receiver such as that shown in FIG. 2. In one embodiment, the calculations of the DR-based navigation updates are as follows:

$$\Delta Position_{DR} = Speed_{DR} * \Delta t$$

$$\Delta Heading_{DR} = Turn\ Rate_{DR} * \Delta t$$

Where the $\Delta Position_{DR}$ is the change in position of the automobile based on the DR data. $Speed_{DR}$ is the speed of the automobile based on the DR measurements. Turn $Rate_{DR}$ is the turn rate of the automobile based on the DR measurements. $\Delta t$ represents the time passing between cycles of the process. $\Delta Heading_{DR}$ represents the change in heading of the automobile based on DR data.

Next, at decisional block 1014 it is determined if the previous position and heading are available. If the answer is yes the process proceeds to block 1016. If the answer to decisional block 1014 is no, the process proceeds to FIG. 10B.

At block 1016, the automobile navigation data is updated. In one embodiment, the automobile navigation data is updated with the following equations:

$$Position = Position + \Delta Position_{DR}$$

$$Heading = Heading + \Delta Heading_{DR}$$

$$Speed = Speed_{DR}$$

Where the $\Delta Position_{DR}$ is the change in position of the platform based on the DR data. $\Delta Heading_{DR}$ represents the change in heading of the automobile based on the DR data. The last available values for the navigation data are updated. $Speed_{DR}$ is the speed of the automobile based on the DR measurements. After block 1016 the process proceeds to FIG. 10B.

Figure 10B:
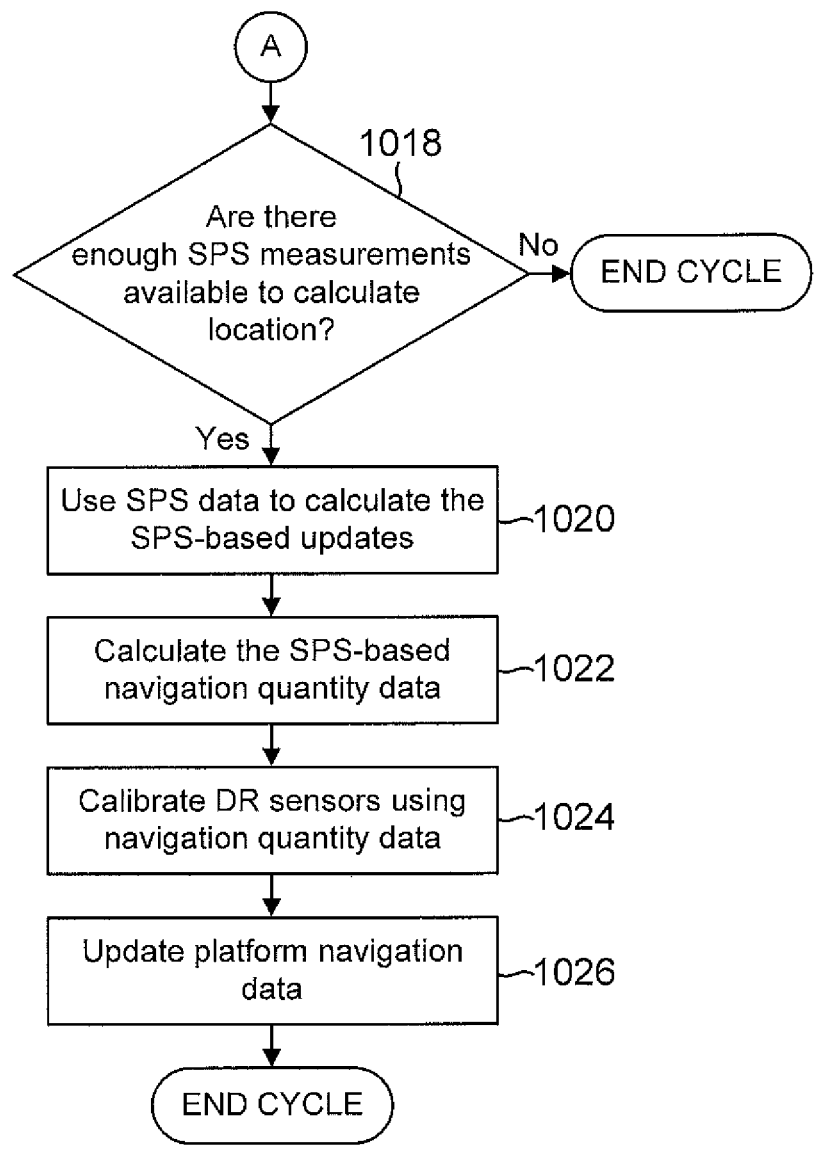

Referring to FIG. 10B, block 1018 represents the step of determining if there are enough SPS measurements available to calculate location. If the answer is no, the cycle ends. If the answer is yes the process proceeds to block 1020.

At block 1020, SPS data is used to calculate the SPS-based updates. In one embodiment, calculations take place in a filter on a SPS system and the results are as follows:

$$\Delta Position_{SPS}$$

$$\Delta Speed_{SPS}$$

Where $\Delta Position_{SPS}$ represents the change in position of the automobile based on the SPS data. $\Delta Speed_{SPS}$ represents the change in speed of the automobile based on the SPS data. In one embodiment, a Kalman filter is used to perform the calculations. In another embodiment, a Least Squares Filter is used to perform the calculations.

Proceeding to block 1022 the SPS-based navigation quantity data are calculated. In one embodiment, the calculations take place in a SPS receiver. In one embodiment, the calculations performed are as follows:

$$Speed_{SPS} = Speed + \Delta Speed_{SPS}$$

$$Heading_{SPS} = \tan^{-1}(EastSpeed_{SPS}/North\ Speed_{SPS})$$

$$Old\ Heading = Heading_{SPS}$$

$$Heading\ Rate_{SPS} = (Heading_{SPS} - Old\ Heading)/\Delta t$$

Where the $Speed_{SPS}$ is the new speed of the automobile based on SPS data. Speed is the current speed of the automobile and $\Delta Speed_{SPS}$ is the change in speed of the automobile since the last SPS measurement. $Heading_{SPS}$ is the current heading based on the SPS data. $EastSpeed_{SPS}$ is the speed of the automobile going in the east direction based on the SPS data. While North $Speed_{SPS}$ represents the speed of the automobile going in the north direction based on the SPS data. Old Heading is the last heading measurement of the automobile and it is set to equal $Heading_{SPS}$, which is the heading based on the SPS data. Heading Rate$_{SPS}$ is the heading rate of the automobile based on the SPS data and $\Delta t$ is the change in time since the last heading measurement was taken.

In the next block of the flow chart, block 1024, the DR sensors are calibrated using the navigation quantity data. In one embodiment, the calculations are as follows:

$$K_{Speed} = Speed_{Auto\ Bus}/Speed_{SPS}$$

$$K_{Turn\ Rate} = Turn\ Rate_{Auto\ Bus}/Turn\ Rate_{SPS}$$

Where $K_{speed}$ is a scale factor for the speed of the automobile. $Speed_{Auto\ bus}$ is the speed of the automobile derived from the automobile bus data. The $Speed_{SPS}$ is the speed of the automobile based on the SPS data. $K_{Turn\ Rate}$ is the scale factor for the turn rate of the automobile and it is set equal to the turn rate based on the automobile bus data divided by the turn rate based on the SPS data.

In the last block of the flow chart, block 1026, the automobile navigation data is updated. In one embodiment, the automobile navigation data is updated with the following equations:

$$Position = Position + \Delta Position_{SPS}$$

$$Heading = Heading_{SPS}$$

$$Speed = Speed_{SPS}$$

Where $\Delta Position_{SPS}$ is the change in position of the platform based on the SPS data. After block 1025, one cycle of the process is complete. To begin another cycle, the process would flow back to the beginning of FIG. 10A.

Figure 11:
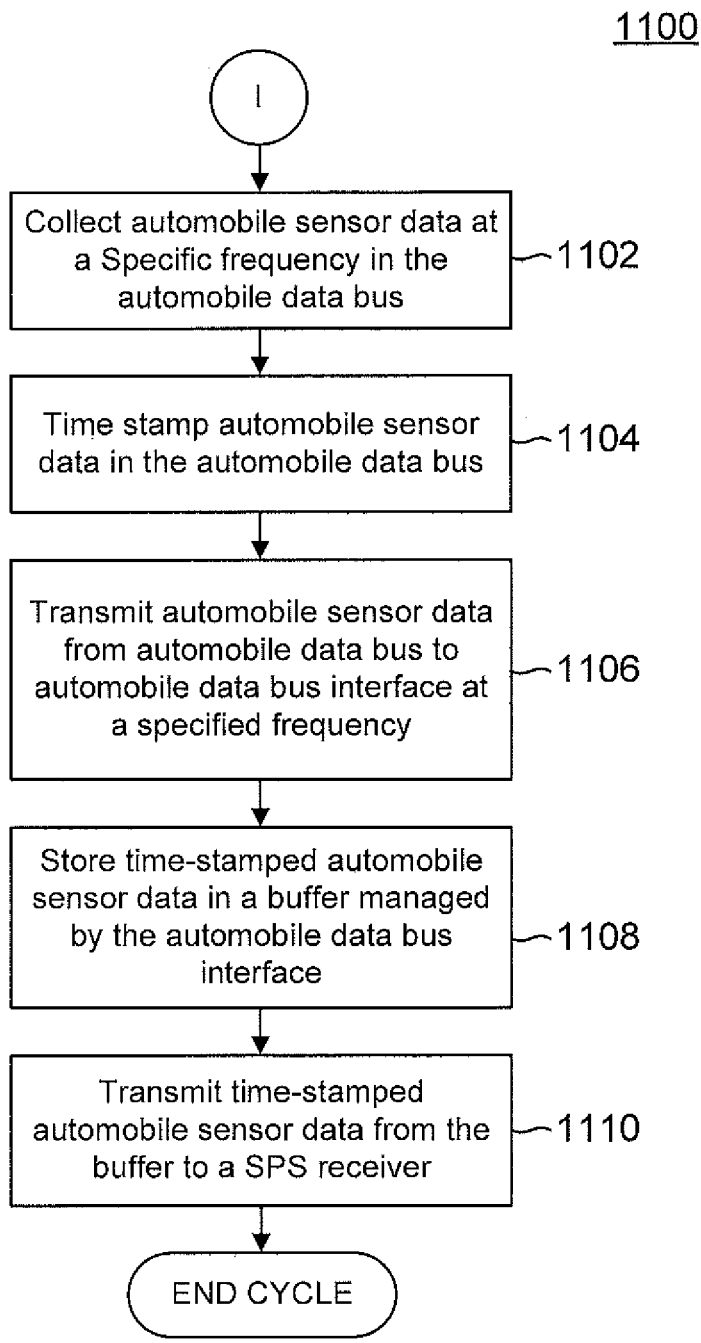
FIG. 11 represents a high level flow chart for a process for collecting, time stamping, transmitting, and storing data, in accordance with one embodiment of the invention.

FIG. 11 is a high level flow chart 1100, for a process for collecting, time stamping, transmitting, and storing data, as implemented in one embodiment of the invention. The flowchart depicts one cycle in the process. In block 1102, the automobile data bus collects automobile sensor data at a specific frequency in the automobile data bus. At block 1104, the automobile sensor data is time-stamped in the automobile data bus. The time stamp represents the time at which the automobile sensor data was read from the respective sensor into the automobile data bus. In one embodiment the automobile data bus is one such as automobile data bus 210 that is shown in FIG. 2.

The automobile sensor data is then transmitted from the automobile data bus to the automobile data bus interface at a specified frequency (Block 1106). In this embodiment, the frequency at which the automobile sensor data is transmitted is one hertz. In one embodiment, the automobile data bus interface used is a data interface such as data interface 208 shown in FIG. 2. At block 1108, the automobile data bus interface stores the time-stamped automobile sensor data into a buffer. This buffer is managed by the automobile data bus interface. In another embodiment, the time-stamped automobile data bus data is stored in the automobile data bus interface.

At block 1110, the time-stamped automobile sensor data is transferred from the buffer to a SPS receiver. In one embodiment, the SPS receiver is a SPS receiver such as SPS receiver 214 shown in FIG. 2. In other embodiments, the time-stamped automobile sensor data is transferred from the buffer to a navigation processor such as navigation processor 212 as shown in FIG. 2. After block 1110, one cycle of the process is complete.

Figure 12:
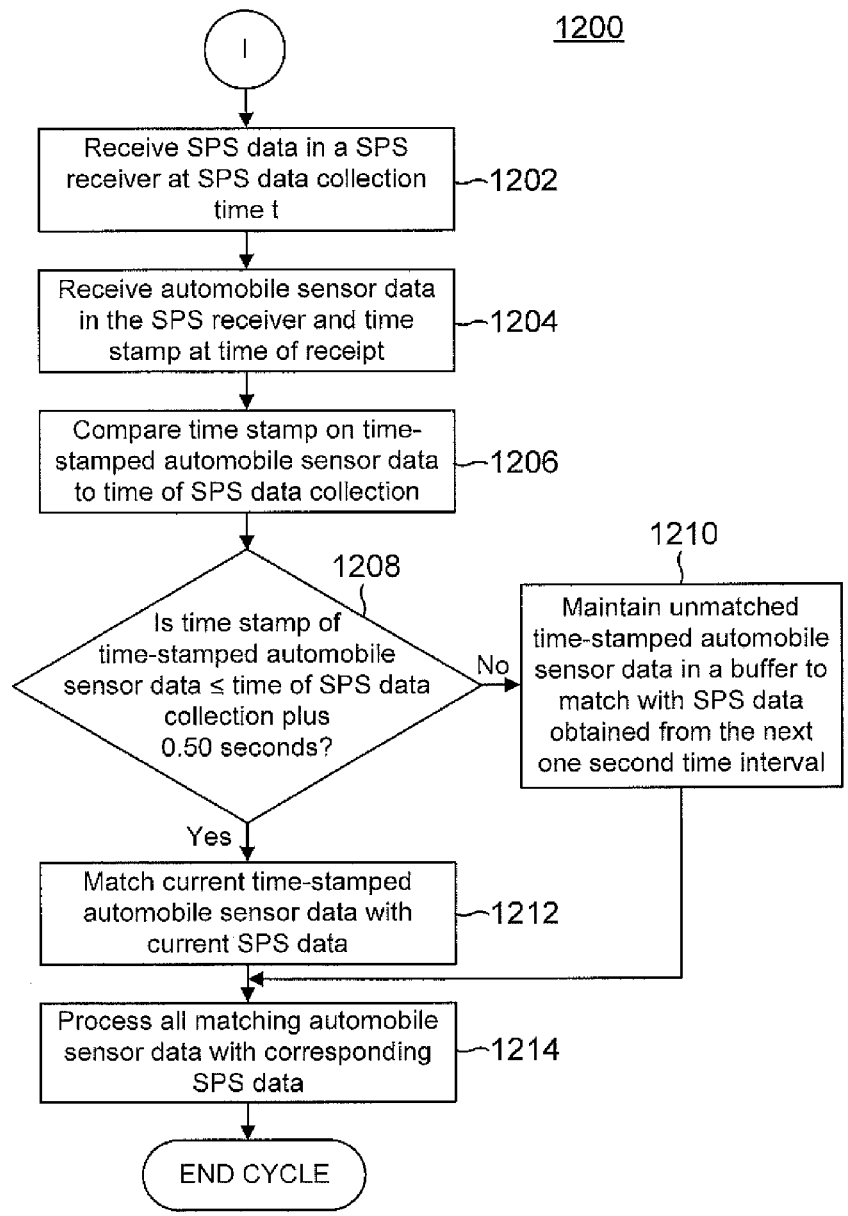
FIG. 12 represents a high level flow chart of a process which implements a process for matching SPS data and DR data, in accordance with one embodiment of the invention.

FIG. 12 is a high level flow chart 1200, of a process which implements a process for matching SPS data and DR data for processing, as implemented in one embodiment of the invention. The flow chart depicts one cycle in the process. In block 1202, a SPS receiver receives SPS data and the time at which the data is collected is set to t. In one embodiment, the SPS receiver used is one such as SPS receiver 214 shown in FIG. 2.

In the next step, at block 1204, automobile sensor data is received in the SPS receiver and time stamped at the time of receipt. In another embodiment, time-stamped automobile sensor data such as shown in FIG. 11 is transmitted from a buffer to a SPS receiver. At block 1206, the time stamp on the time-stamped automobile sensor data is compared to the time the SPS data was collected. In one embodiment, the comparison is done in an SPS receiver.

Decisional block 1208 asks if the time stamp of the time-stamped automobile sensor data is less than or equal to the collection time of the SPS data plus 0.50 seconds. If the answer is no, the process proceeds to block 1210. If the answer to decisional block 1208 is yes, the process proceeds to block 1212.

At block 1210, any time-stamped automobile sensor data that did not fit the criteria in block 1208 is maintained in a buffer. This unmatched time-stamped automobile sensor data will be matched with SPS data obtained from the next one-second time interval. In one embodiment the buffer is in the SPS receiver. In one embodiment, the buffer is located in memory. The process then returns to before block 1214.

Following the process flow after a yes answer to decisional block 1208, the process moves to block 1212. At block 1212, the current time-stamped automobile sensor data is matched with the current SPS data. In one embodiment, the matching is performed in the SPS receiver. Proceeding to block 1214, the automobile sensor data that matches with the corresponding SPS data is processed. The processing takes place in the SPS receiver. After block 1214, one cycle of the process is complete.

Figure 13:
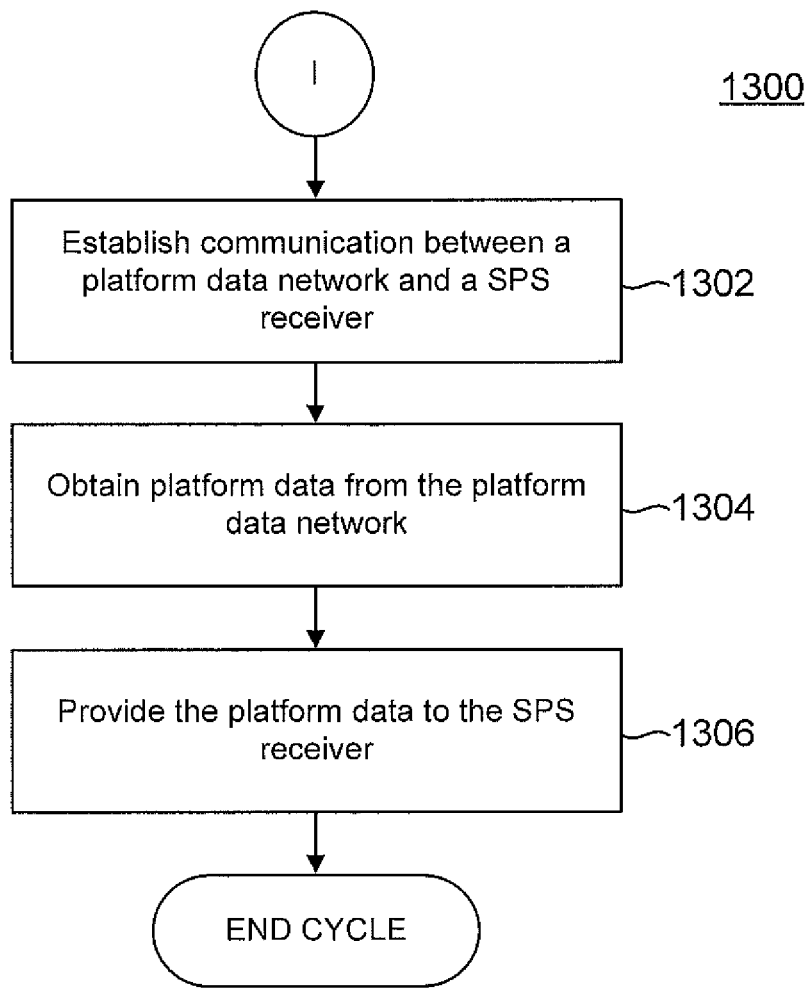
FIG. 13 is a flow chart depicting a process for providing platform data from a platform data network to a SPS receiver, in accordance with one embodiment of the invention.

FIG. 13 is a high level flow chart 1300, for a process for providing platform data from a platform data network to a SPS receiver, in accordance with one embodiment of the invention. The flow chart depicts one cycle in the process. In block 1302, communication is established between a platform data network and a SPS receiver. In one embodiment the communication can be wireless. In another embodiment the communication can be wired, or by some other means. In one embodiment the communication established between the platform data network and the SPS receiver is one way, going from the platform data network to the SPS receiver. In another embodiment the communication established between the platform data network and the SPS receiver is two way. In another embodiment, the communication established is to a navigation processor. In one embodiment, the communication established is to a location processor in a SPS receiver. In one embodiment, communication is established by a data interface, such as the data interface 208 shown above in FIG. 2.

In the next step, at block 1304, platform data is obtained from the platform data network. In one embodiment, the platform data is obtained by a data interface, such as the data interface 208 shown above in FIG. 2.

Then the platform data is provided from the platform data network to the SPS receiver (Block 1306). In one embodiment, the platform data is obtained by a data interface, such as the data interface 208 shown above in FIG. 2. In another embodiment a next step takes place where the SPS receiver sends SPS data back to the platform data network. In yet another embodiment, blocks 1304 and 1306 are combined into one step.

In one embodiment of the process, the platform is a vehicle and the communication is established by a data interface, such as data interface 208 shown above in FIG. 2. In this embodiment of the process, the data interface performs the following functions. First the data interface establishes communication with a vehicle's internal data network. This can be done via an automobile data bus, such as automobile data bus 210 shown in FIG. 2. In one embodiment the data interface 208 is connected by a hard wire to the automobile data bus 210. In another embodiment the communication can be established between the platform data network and the SPS system by some other means, such as, for example, a wireless link.

Next, the data interface 208 requests the internal messages from the vehicle, which carry the information needed for location calculations. These internal messages can be vehicle sensor data. Next in the process, the data interface 208 extracts the data pertinent to location calculations. The data interface 208 then formats the pertinent data to conform to the target processor's defined protocol. Finally, the interface transmits the platform data to the appropriate areas of a location processor for further processing.

Figure 14:
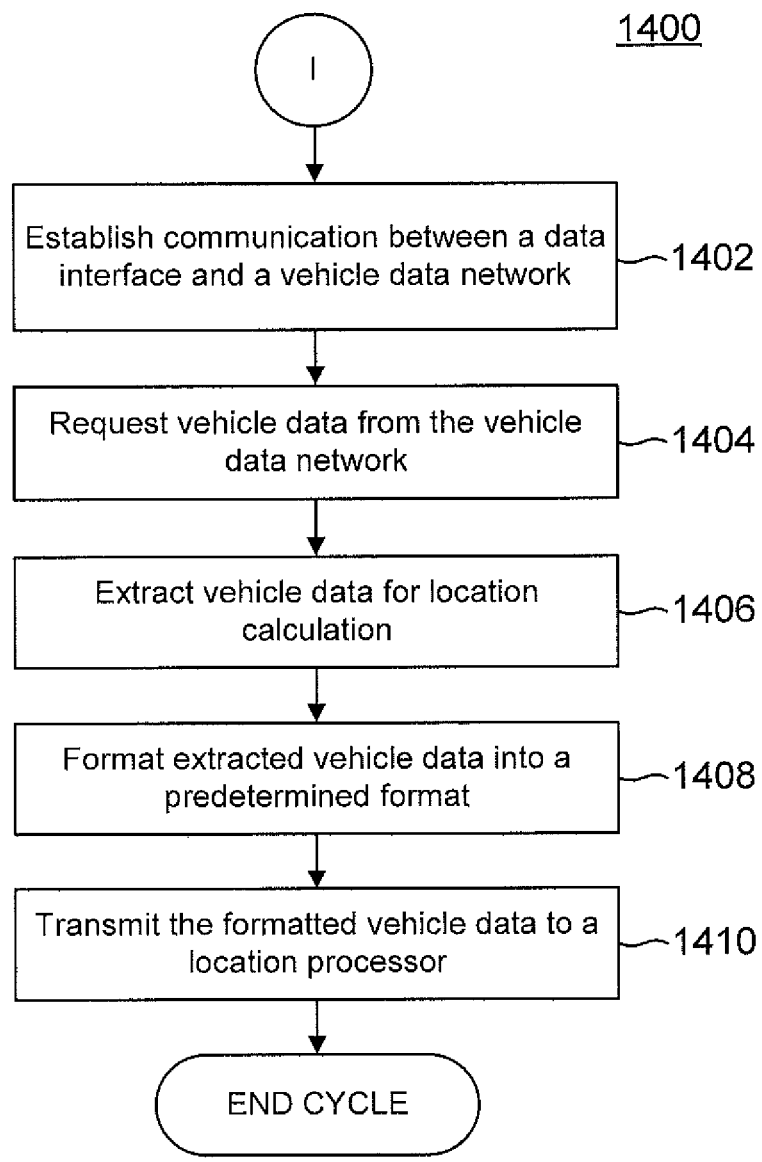
FIG. 14 is a flow chart depicting a process for formatting vehicle data, in accordance with one embodiment of the invention.

FIG. 14 is a high level flow chart 1400, for a process for formatting vehicle data, in accordance with one embodiment of the invention. In this embodiment, the process is performed by a data interface, such as data interface 208 shown in FIG. 2. The flow chart depicts one cycle in the process. In block 1402, communication is established between a data interface 208 and a vehicle data network. Communication can be established with the vehicle data network via an automobile data bus, such as automobile data bus 210 shown in FIG. 2. In other embodiments, the data interface establishes communication with a platform data network other than a vehicle data network.

Next, in block 1404, the data interface 208 requests, vehicle data from the vehicle data network. In this embodiment, the vehicle's data network provides vehicle sensor data.

In block 1406, the data interface 208 extracts the vehicle data relevant to location calculation. In this embodiment, the vehicle data extracted carries information that is useful for vehicle location calculations.

The data interface 208 then formats the extracted vehicle data into a predetermined format (Block 1408). In this embodiment, the vehicle data is formatted into a message to conform to a location processor's data format. In one embodiment, the message format is defined as provided below.

One embodiment of the predetermined format described in Block 1408 is as a message. In one example, the message can assume the structure shown below.

| Message Structure |
|---|
| Message Header |
| Number of valid data sets: 0 to n, |
| Type of data |
| data set 0 |
| data set 1 |
| data set 2 |
| data set 3 |
| . |
| . |
| . |
| n    data set n |

In the foregoing example, the message header identifies the source of the message. The next line of the message provides information regarding the number of valid data sets. In one embodiment, vehicle data is collected from automobile data bus 210 in the vehicle data network. A new data set of vehicle data is taken by the vehicle data network from the automobile data bus 210, at a series of time intervals. In this embodiment, the data sets are taken at n equal time intervals over a one-second period.

The next line of the message defines the type of data. For example, in this embodiment, where the platform is a vehicle, the data set comprises vehicle sensor data. The remaining lines in the message contain the data sets. In this message there are n data sets, so each line contains a data set. In one example, a data set contains values for vehicle reverse data, odometer data, and gyroscope data at a given time. In another embodiment, the data set contains values for vehicle reverse data and wheel speed data at a given time. In this message there are n data sets, one data set is taken at each of n equal time intervals during a one second time period.

In other embodiments, the data interface can adjust the format based on the data structure used in the location processor. In this embodiment the data interface formats the extracted vehicle data into a predetermined format, but in other embodiments, the data interface can adjust the format, thus the format is dynamic. For example, in a predetermined format, if the SPS receiver has a location processor 206 that processes digital data of a specified structure, the vehicle sensor data will be formatted into digital data of the same specified structure. In yet another embodiment, where formatting of the data is dynamic, it is not static, or in other words, it can vary over time. For example, dynamic formatting may be needed in the following three embodiments: In one embodiment, the data types collected could vary; In another embodiment, the time interval of data collection could vary; In yet another embodiment, the frequency of data collection could vary. Also, in some instances the data interface may need to translate the vehicle data from analog to digital before formatting the vehicle data.

Next in process 1400, in block 1410, the data interface 208 transmits the formatted vehicle data to a location processor (Block 1408). The location processor is one such as location processor 206 shown above in FIG. 2. The formatted vehicle can then be processed in the location processor. In another embodiment, the data interface 208 transmits the message to a navigation processor.

The format of the message can be any format that is compatible for transmission to the location processor 206, such as, for example, html, xml, etc.

The invention can be implemented on a computer readable medium. A computer-readable medium can include any kind of computer memory such as floppy disks, conventional hard disks, CD-ROMS, Flash ROMS, nonvolatile ROM, and RAM.

Furthermore, alternative embodiments of the invention which implement the system in hardware, software, or a combination of both hardware and software, as well as formatting, synchronizing, and distributing the data in a different fashion will be apparent to those skilled in the art and are also within the scope of the invention.

It will be further appreciated that the instructions represented by the operations in FIGS. 10, 11, 12, 13, and 14, and in other described operations provided herein, are not required to be performed in the order illustrated or described, and that all the processing represented by the operations may not be necessary to practice the invention. Further, the processes illustrated, or described can also be implemented in software stored in any one of or combinations of a RAM, a ROM, or a hard disk drive.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A system for an automobile comprising:
    an OBD-II bus configured to carry dead reckoning data from vehicle sensors including wheel speed sensors and a reverse sensor;
    a satellite positioning system (SPS) receiver; and
    a data interface between the OBD-II bus and the SPS receiver, wherein the SPS receiver receives the dead-reckoning data from the OBD-II bus through the data interface and uses this dead-reckoning data to aid in a determination of a location for the automobile, wherein the SPS receiver is configured to use dead reckoning data from the wheel speed sensors to determine a heading for the vehicle.

2. The system of claim 1, wherein the OBD-II bus receives SPS data from the SPS receiver via the data interface.

3. The system of claim 1, wherein the data interface is a wire.

* * * * *